United States Patent [19]

McGraw et al.

[11] Patent Number: 5,368,823
[45] Date of Patent: Nov. 29, 1994

[54] AUTOMATED SYNTHESIS OF OLIGONUCLEOTIDES

[75] Inventors: Royal A. McGraw; William M. Grosse, both of Athens, Ga.

[73] Assignee: University of Georgia Research Foundation, Inc., Athens, Ga.

[21] Appl. No.: 16,739

[22] Filed: Feb. 11, 1993

[51] Int. Cl.$^5$ ............................ G05D 7/00; C12M 1/36
[52] U.S. Cl. ...................................... 422/134; 422/116; 422/111; 435/287; 435/289; 935/88
[58] Field of Search .............. 422/111, 116, 131, 134; 435/287, 289; 935/88

[56] References Cited

U.S. PATENT DOCUMENTS

| | | | |
|---|---|---|---|
| 4,517,338 | 5/1985 | Urdea et al. | 935/88 |
| 4,671,941 | 6/1987 | Niina et al. | 435/287 |
| 4,690,165 | 9/1987 | Leytes et al. | 137/112 |
| 4,748,002 | 5/1988 | Neimark et al. | 422/131 |
| 4,811,218 | 3/1989 | Hunkapiller et al. | 435/6 |
| 4,861,866 | 8/1989 | Durrum et al. | 422/134 |
| 5,053,454 | 10/1991 | Judd | 422/131 |
| 5,055,408 | 10/1991 | Higo et al. | 436/48 |
| 5,104,621 | 4/1992 | Pfost et al. | 422/67 |
| 5,112,575 | 5/1992 | Whitehouse et al. | 935/88 |
| 5,175,209 | 12/1992 | Beattie et al. | 422/131 |
| 5,213,761 | 5/1993 | Sakagami | 436/49 |

FOREIGN PATENT DOCUMENTS

| | | |
|---|---|---|
| 1058340 | 3/1989 | Japan . |
| 2118189 | 10/1983 | United Kingdom . |
| WO90/05293 | 5/1990 | WIPO . |

OTHER PUBLICATIONS

B. D. Warner et al., "Laboratory Methods, Construction and Evaluation of an Instrument for the Automated Synthesis of Oligodeoxyribonucleotides"; Aug. 16, 1984, pp. 403, 405–406.
S. J. Horvath et al., "An Automated DNA Synthesizer Employing Deoxynucleoside 3'-Phosphoramidites"; 1987, p. 316.
J. W. Giles, "Advances in automated DNA synthesis"; Nov. 1986.
Christenson et al., "Automated solid phase oligonucleotide synthesizer"; Research Disclosure, Feb. 1982.
Applied Biosystems, Model 380A DNA Synthesizer Users Manual; Dec. 1985.

*Primary Examiner*—Robert J. Warden
*Assistant Examiner*—T. A. Trembley
*Attorney, Agent, or Firm*—Greenlee and Winner

[57] ABSTRACT

Apparatus and method for the automated synthesis of DNA segments utilizing multiple reaction columns, all of which are open at the inlet end to the atmosphere of a reaction chamber. A movable reagent supply line outlet is positioned adjacent to the column inlet end to apply reagent to each of the columns according to an input sequence of delivery. The delivery sequence is under processor control. Reagents are removed from all columns simultaneously through the application of vacuum at the outlet end of each column. The device enables the parallel synthesis of large numbers of different oligonucleotide sequences of different lengths.

26 Claims, 9 Drawing Sheets

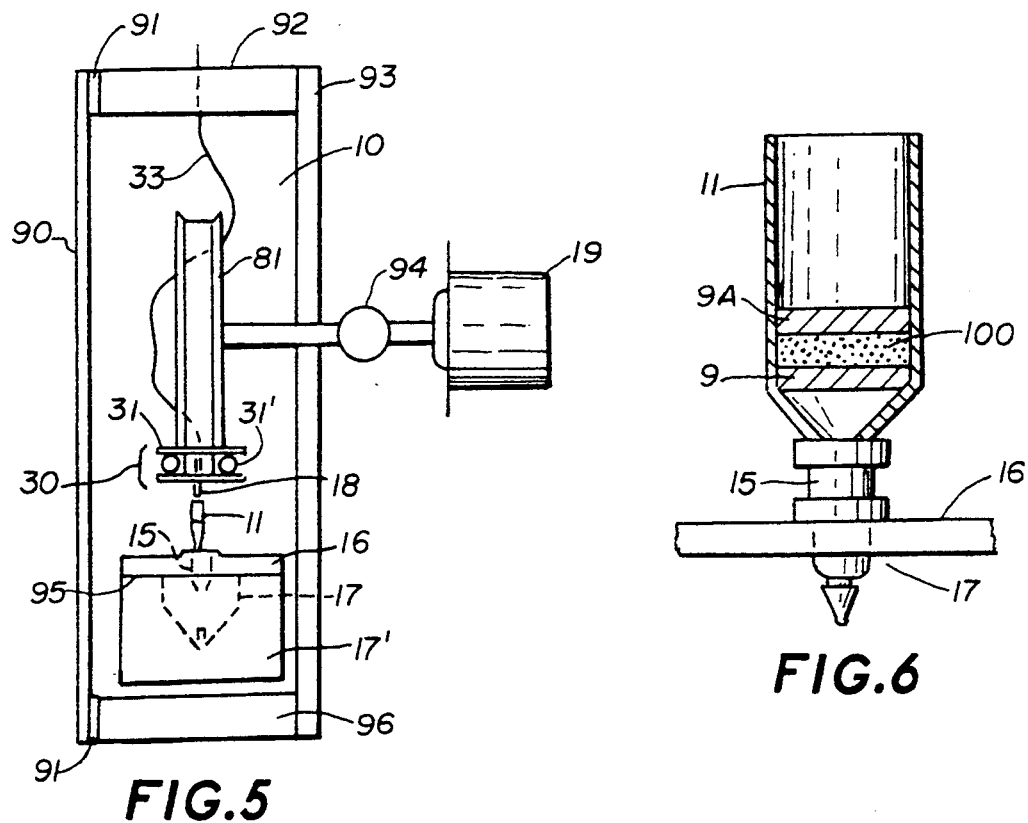
FIG.5
FIG.6
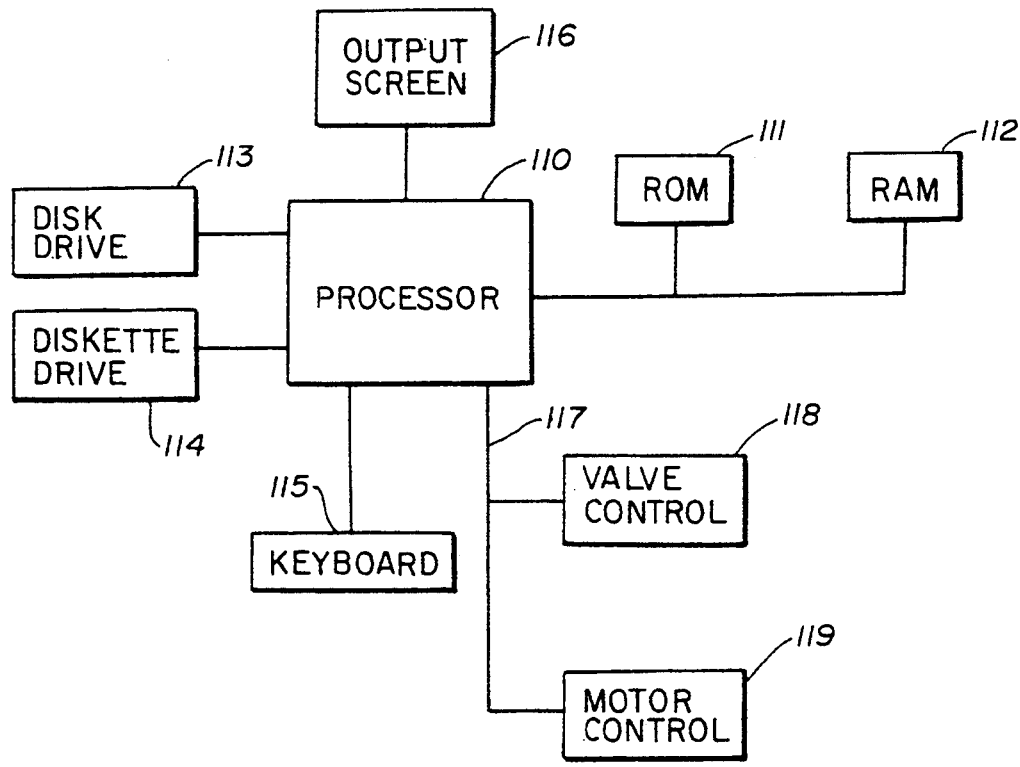
FIG.7

AUTOMATED SYNTHESIS OF OLIGONUCLEOTIDES

This invention relates to apparatus and method for carrying out the automated chemical synthesis of oligodeoxynucleotides and, in particular, the synthesis of multiple different oligodeoxynucleotides in a concurrent manner.

BACKGROUND OF THE INVENTION

The art of synthesizing DNA has progressed to include automated instruments for concurrently producing multiple DNA segments, that is, oligodeoxyribonucleotides, a term that is frequently shortened to oligodeoxynucleotides and shortened further to oligonucleotides. These machines often make use of reaction columns in which a support material for the reaction is positioned within the columns between inert, porous filters, referred to as "frits." The reaction columns are placed within the automated apparatus so that chemicals can be added to the columns in sequence and in appropriate amounts in an automated fashion. The object is to synthesize the desired oligonucleotides from a starter material bound to the support.

Currently known automated synthesizers can produce only a few oligonucleotides at a time limited by the number of reaction columns located within the machines. The number of reaction columns is limited as a practical matter by the increased complexity of the plumbing and valving network as the number of columns increase since currently known synthesizers provide a tightly plumbed network from the several reagent supply reservoirs to each reaction column. As a result, conventional automated synthesizers typically provide for automated synthesis of only one to four primer length (typically 20-mer) oligonucleotides in several hours. If a four column unit is operated three times in an 8-hour workday, twelve primers can be produced. To produce 100 oligonucleotide primers per day requires eight of these expensive machines. Also, the cost of the expensive reagents and the labor associated with the synthesis of 100 primers is high. While improvements in the production of primers holds great promise for research and development activities in many areas, including, for example, the effort needed to sequence the entire human genome, the automated synthesizers currently available are inappropriate for many applications in terms of throughput, operating costs and yields.

In addition to the production of primer length oligonucleotides currently known synthesizers can produce much longer oligonucleotides, i.e., greater than 100 nucleotides in length. The time to produce a 100 nucleotide DNA is approximately five times longer than the production of a 20 nucleotide DNA.

It is, therefore, an object of this invention to provide an instrument that uses considerably less reagent material for equivalent yields, reduces labor cost in the operation, keeps the initial expense of the machine within reasonable limits by limiting the complexity of the machine and enables the production of hundreds of primers each day.

SUMMARY OF THE INVENTION

In the apparatus of this invention a reaction chamber contains one or more reaction columns in which a particular oligonucleotide sequence is synthesized. The inlet end of each reaction column is open to the atmosphere within the chamber and the chamber itself is preferably sealed and filled with an inert gas. The instrument has a movable supply line outlet located within the chamber. The outlet can be positioned above the inlet end of each of the columns so that nucleotide reagents, capping reagents, deblocking reagents, wash chemicals etc. can be provided to each of the columns. All of these reagents are located in a supply system which includes reservoirs and valving to connect the reservoirs with the supply line. A flush/prime column is also located within the chamber so that the supply line can be flushed and primed between each different chemical reagent addition. After supplying the appropriate reagent to each of the reaction columns, a pressure differential is applied to the columns to drain the reagent. Preferably a vacuum source is connected to the outlet end of the reaction columns to rapidly draw the chemicals from all of the columns simultaneously thus leaving the columns dry and ready to receive the next reagent.

A removable carrier plate is provided for holding a plurality of reaction columns and enabling ease of movement of the reaction columns into and out of the reaction chamber. When assembled with the reaction chamber, the carrier plate seals the reaction chamber from an exit basin, allowing atmospheric communication between the chamber and the basin to occur only through the reaction columns.

The reaction columns are comprised of a porous material and a reaction support material. The porous material sustains reagents to saturate and interact with the reaction support material until a pressure differential is applied to draw the reagents through the porous material to the exit basin. The support material may be a derivatized support such as controlled pore glass (CPG), placed in the column on a porous material such as a glass frit. Alternatively, the porous material may itself be appropriate for derivatization thereby combining the frit and support material within the reaction column. A process of directly derivatizing the support material can be carried out in the apparatus prior to the synthesizing process.

In operating the apparatus according to a desired sequence of reagent application, each of the reaction columns is designated to receive a specific reagent. A computer with associated electronics and software controls all aspects of the process including the opening and closing of valves for the proper time period and in correct sequence, the movement of the supply line outlet, the provision of the proper incubation period for each reagent addition to the columns and the evacuation of the columns after the incubation period is complete.

Asynchronous coupling is used, that is, when coupling the nucleotide reagents, a first such reagent is delivered to all columns requiring that base regardless of the position of the column. Columns not requiring the first reagent are skipped over by the movable outlet.

The apparatus can be used for automating various processes by utilizing appropriate reagents in the supply system, appropriate control programs and appropriate reaction supports. As mentioned above, for example, reaction supports for synthesizing oligonucleotides may be directly derivatized in the apparatus and if performed directly prior to the synthesizing process, the carrier plate can remain in the apparatus for both the derivatization and synthesizing processes.

BRIEF DESCRIPTION OF THE DRAWINGS

FIG. 5 is a side view of the reaction chamber.

FIG. 6 shows a typical reaction column used within the reaction chamber.

FIG. 7 is a block diagram of the major components in the control center of FIG. 1.

DETAILED DESCRIPTION OF THE INVENTION

With reference to the drawings, like numbers indicate like parts and structural features in the various figures.

Figure 1A:
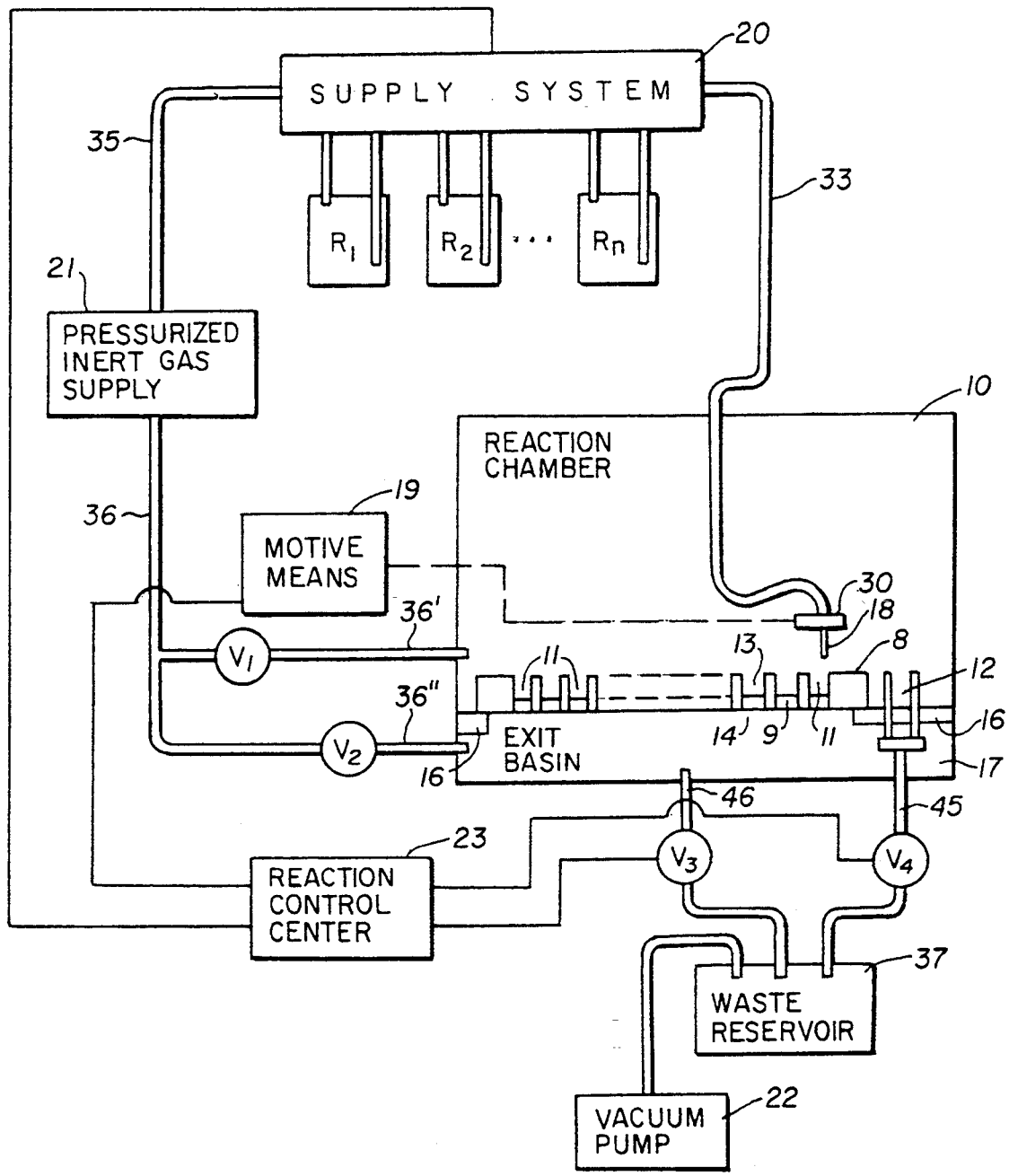
FIG. 1A is a block diagram showing the major components of the inventive apparatus.
Figure 1C:
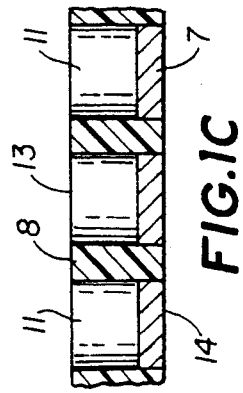
FIG. 1C is a sectional view showing reaction support material located in the reaction columns of FIG. 1B.
Figure 1B:
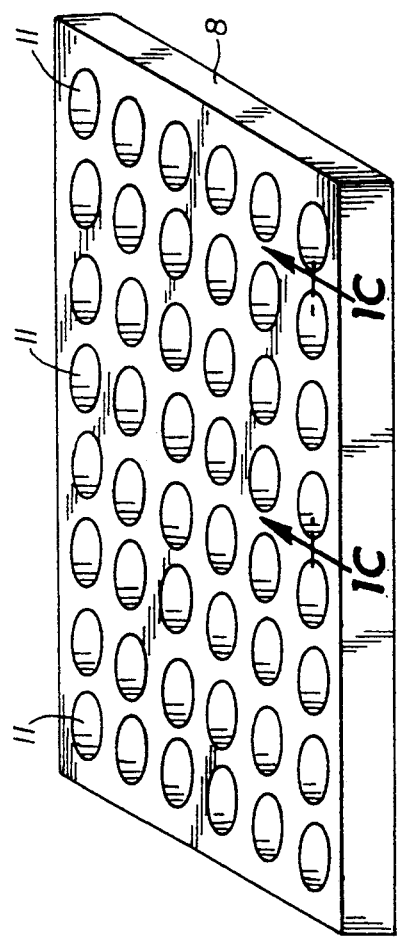
FIG. 1B shows a carrier plate with reaction columns for assembly with the apparatus of FIG. 1A.

FIG. 1A shows a sealed reaction chamber 10 in which a multiplicity of reaction columns 11 are located. A flush column 12 is also situated within the reaction chamber. Each reaction column 11 contains an open inlet end 13 and an outlet end 14 which empties into exit basin 17. The columns 11 are formed into a carrier plate 8, the details of which are shown in FIGS. 1B and 1C. Carrier plate 8, when inserted into the reaction chamber, fastens to a bulkhead 16 to seal the reaction chamber 10 from the exit basin, thereby allowing atmospheric communication between reaction chamber 10 and exit basin 17 only through the reaction columns 11. A movable reagent outlet 18 is mounted on a sliding carriage 30 which is driven by motive means 19 to position the outlet 18 over the inlet end of each of the reaction columns in the reaction chamber 10.

Chemical agents are stored in reservoirs $R_1$ through $R_n$ and are delivered through valves and tubing in the supply system 20 over supply line 33 to the movable reagent outlet 18. An inert gas supply 21 supplies gas under pressure over line 35 to each of the reservoirs $R_1$ through $R_n$. By pressurizing the reservoirs, the liquid reagent is caused to move into the supply line when the outlet valve associated with the reservoir is opened. Inert gas is also provided from supply 21 through lines 36 and 36' together with bleeder valve $V_1$ to the reaction chamber 10. Inert gas is sent to the exit basin 17 through lines 36 and 36' together with valve $V_2$. Preferably, a vacuum pump 22 is connected to the exit basin through valve $V_3$ and line 46 in order to evacuate basin 17 and draw any reagent chemicals located in the reaction columns to waste reservoir 37. Vacuum pump 22 also acts to evacuate the flush column 12 through valve $V_4$ and line 45 in order to draw any chemicals which have been flushed into column 12 into the waste reservoir 37.

A reaction control center 23 is connected to control all of the valves within the system as well as the motive means 19 in order to control the additions of reagent chemicals in the proper sequence to each of the reaction columns.

FIGS. 1A–1C show a movable carrier plate 8 with reaction columns 11 formed therein. Each of the reaction columns contain a porous support material 7 appropriately derivatized for the desired reaction. When reagent chemicals are added to the reaction columns 11, each chemical will be sustained by the porous material to saturate and interact with the derivatized support for a desired incubation period until drawn through the porous support 7 by the application of a pressure differential to the inlet and outlet ends of the reaction columns. The reaction columns are conveniently formed in the carrier plate 8 for manual movement of the columns into and out of reaction chamber 10. FIG. 1B shows a carrier plate 8 with the columns 11 in a two dimensional matrix with 48 reaction columns in the array. The invention contemplates carrier plates with 100 or more reaction columns for concurrent synthesis of 100 or more sequences. Motive means 19 provides two dimensional motion to movable outlet 18 so that it can be positioned over any selected column.

Figure 2:
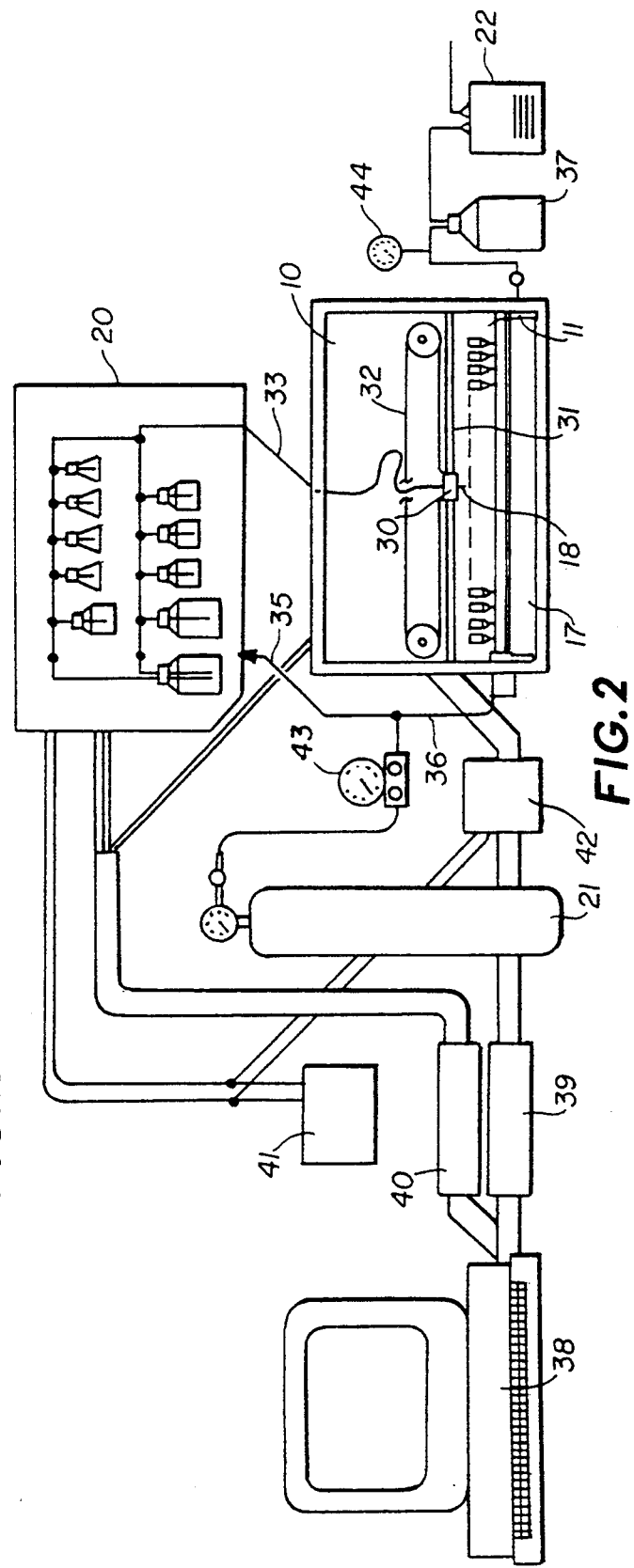
FIG. 2 is a schematic diagram of a laboratory prototype providing a specific version of the apparatus set forth in FIG. 1.

FIG. 2 shows a laboratory prototype built according to the principles of the invention shown in FIG. 1. A reaction chamber 10 contains a multiple number of reaction columns 11 which are positioned in a single row rather than in a two dimensional array. The actual number of reaction columns In the laboratory prototype may be as high as 32 although FIG. 2 does not show quite that many. Reaction columns 11 in the prototype were built to utilize Luer fittings as explained in detail below and are therefore of a different construction from the carrier plate arrangement shown in FIGS. 1B and 1C.

The movable reagent outlet (supply line outlet) 18 is positioned on a slide 30 which is moved back and forth along rails 31. Slide 30 is connected to a drive belt 32 which is driven through motive means 19 (shown in FIG. 1). The supply line outlet 18 is connected through line 33 to a reagent supply system 20. System 20 contains a valve manifold shown in detail in FIG. 3, together with all of the chemical reservoirs needed for the particular process to be performed by the apparatus. Ten reservoirs are shown in FIG. 2 for an exemplary process performed by the prototype. The pressurized inert gas supply 21 is connected through line 35 to all of the reservoirs although the connections to each reservoir are not specifically shown in FIG. 2. Line 36 carries inert gas to the reaction chamber 10 and to the exit basin. Basin 17 is also connected to the vacuum pump 22 through waste reservoir 37.

In the laboratory prototype, a personal computer 38 is used to control the sequence through which chemicals are added to the reaction columns to produce the desired oligonucleotide in each column. The computer 38 acts to control the movement of outlet 18, the operation of the valves, the timing of the reactions, in short, the entire process. Output of computer 38 is provided through an input/output (I/O) board 39 and a relay board 40. The system also includes a 24 volt power supply 41 and a parallel expansion board mounted within the frame of computer 38.

A stepper motor is used as the motive means 19 (shown in FIG. 1) to position the reagent outlet 18 in accordance with the control sequence. The motive means 19 is under the control of a stepper motor controller 42. The controller 42 is connected to the computer 38 which is the ultimate control over the positioning of the reagent outlet 18 by the stepper motor. FIG. 2 also shows a pressure regulator 43 for regulating inert gas pressure and a vacuum gauge 44.

Figure 3:
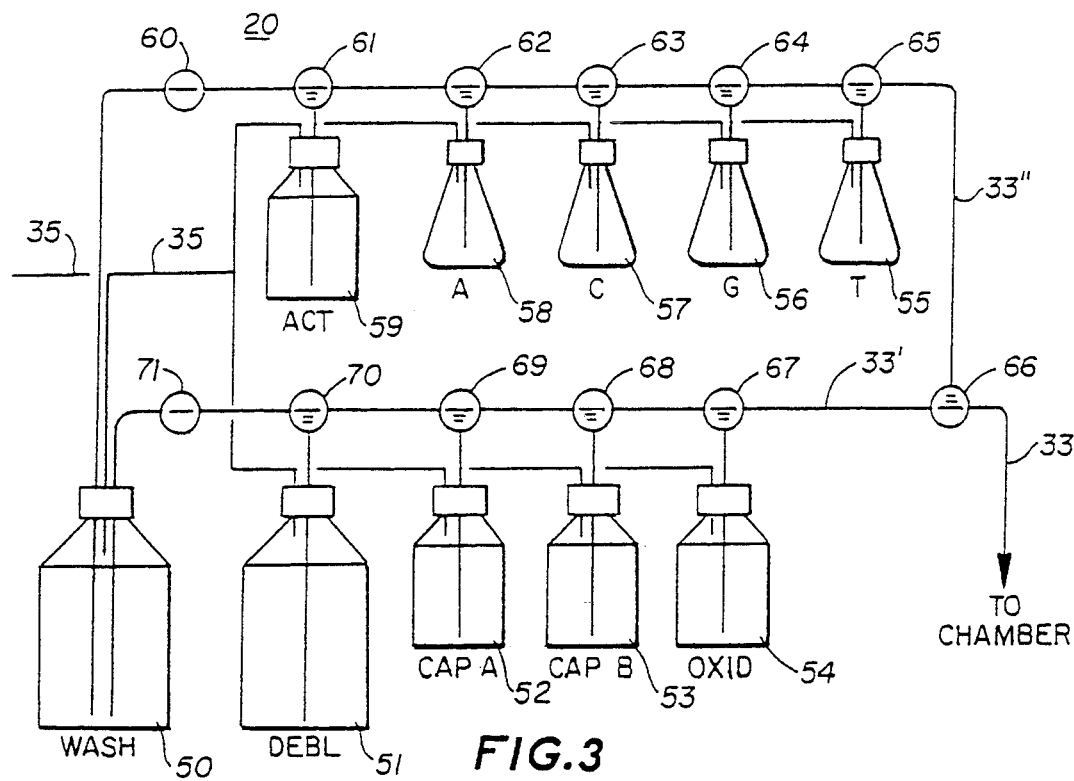
FIG. 3 shows details of the reagent supply system used with the laboratory prototype of FIG. 2.

FIG. 3 shows some details of the prototype reagent supply system 20. The system consists of reagent bottle reservoirs 50–59, valves 60–71, reagent outlet supply lines 33, 33' and 33", and inert gas pressurization line 35 connected to each of the reservoirs. FIG. 3 shows that the wash chemical located in reservoir 50 is located within the supply system so as to flush out the entire supply line when the associated valves are operated. For example, operation of valve 71 acts to wash lines 33' and 33 while operation of valve 60 acts to wash lines 33" and 33. Obviously, the system can be easily expanded or contracted to supply a different number of reagents.

Figure 4:
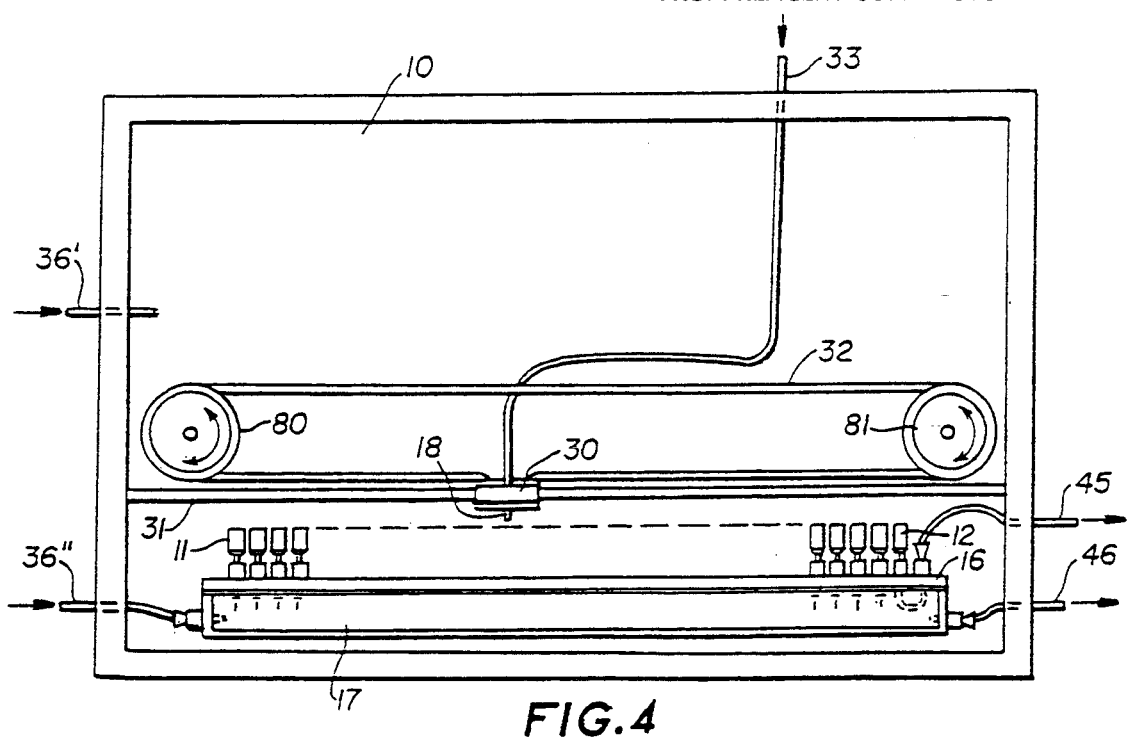
FIG. 4 shows details of the reaction chamber of FIG. 2, with 32 reaction columns located therein.

FIG. 4 is a close-up view of the reaction chamber 10 showing the 32 reaction columns 11 in the laboratory prototype. FIG. 4 shows the reagent supply line outlet be located on a slide 30 which moves back and forth on rail 31 (and rail 31' shown in FIG. 5). Slide 30 is connected to drive belt 32 which is mounted on pulleys 80 and 81. While not shown in FIG. 4, motive means 19 is connected to drive pulley 81. Inert gas is introduced into the reaction chamber 10 through line 36' and into the exit basin 17 by line 36". Vacuum is supplied to the flush column 12 by means of line 45 while line 46 applies a vacuum to the exit basin 17.

FIG. 5 is an end or side view of the reaction chamber 10 with the side wall removed, and shows clearly that the slide 30 is mounted on two guide rails 31 and 31'. The drive pulley 81 is connected to stepper motor 19 through a flexible coupling 94. The reaction chamber 10 is sealed to the atmosphere of the room in which it is located through top, back and bottom walls 92, 93, and 96, respectively, through side walls, not shown, and through a removable front transparent face 90 which is sealed to the top, bottom and side walls of the reaction chamber through seal 91. In the prototype, the exit basin 17 is a hollowed out portion of a solid frame 17'. The bulkhead 16 is sealed to the top of the solid frame 17' by means of the seal 95 such that the exit basin 17 is not connected to the atmosphere in the reaction chamber 10 except through the Luer fittings 15 which receive the reaction columns 11.

FIG. 6 shows a close-up view of a cylindrically-shaped reaction column 11 used with the prototype of FIG. 2. The column 11 has a conically-shaped outlet end for insertion into a mating Luer fitting 15. The reaction column contains a porous frit 9 with the support 100 placed on the frit 9. A second frit 9A is located over the support 100. The support is made of Controlled Pore Glass (CPG) which is of a specified bead size with pores therein of a specified size. Starter material for the reaction desired is comprised of a support material such as CPG, appropriately derivatized with a protected nucleoside (A, C, T or G) as dictated by the 3' nucleoside of each sequence to be synthesized. The CPG support of specified size with the proper derivatized nucleoside is commercially available and is placed in the reaction column. The derivatized nucleoside support may also be produced using the apparatus of this invention.

FIG. 7 shows the major components of the reaction control center 23. A processor 110 is connected to a read-only memory (ROM) 111 and a random access memory (RAM) 112. A hard disk drive 113 and a diskette drive 114 are included in the system for conveniently storing the sequences of oligonucleotides to be produced. An input means such as keyboard 115 and an output screen 116 enable interactive communication between the user of the system and the processor 110. The output line 117 carries output signals to the valve control unit 118 and the motor control unit 119 in order to position the reagent supply line outlet 18 to the correct reaction column and place into that reaction column the correct chemical reagent in accordance with the sequence being processed by the apparatus. In the laboratory prototype a Zenith personal computer, model Z-100, was used together with a parallel expansion board from Qua-Tech (POPXB-721) and a Qua-Tech relay board (OPOUT-241), together with an externally mounted 24-bit digital I/O board (Qua-Tech UIO-10).

With the description of the apparatus now complete, a description of a particular process using the inventive apparatus follows.

Prior to the operation of the instrument, the various oligonucleotide sequences to be produced by the device are entered into a text file and located on either a diskette for use in the diskette drive 114, or on a hard disk located in the disk drive 113. A program to control the operation of the valves and the motor is located in RAM 112. The control program accesses the desired text file and directs the automated synthesis of DNA according to the sequences found therein. An example of 32 nucleotide sequences for synthesizing 32 particular oligonucleotides is shown in Table 3 infra.

Also, prior to the beginning of the operation, the 32 columns of the prototype device are filled with the appropriate support material. The columns are conveniently located on a carrier plate 8 which is moved from the preparation area and inserted into the reaction chamber 10. As previously noted, the supports can contain different nucleoside materials one from another so that different sequences can be produced concurrently in the inventive device.

After moving the carrier plate 8 with the reaction columns to the reaction chamber 10 and securing each of the reaction columns into its associated Luer fitting 15, the transparent front plate 90 is fastened in place to produce an airtight reaction chamber 10.

Reagent bottles are filled with appropriate reagents and capped tightly. The reagent supply system is pressurized to about 7.5 psi with inert gas, for example, argon. Reagent lines from the bottles to the valves are primed by individually switching the appropriate valves. The vacuum pump is turned on and the vacuum adjusted to about 20 inches of mercury. Manual valve $V_1$, FIG. 1, as well as any manual valves associated with the argon tank 21 are opened to flood the reaction chamber.

When the synthesis program is started, the instrument enters the first synthetic cycle. As in conventional instruments, a cycle consists of the following reactions: deblocking (detritylation), coupling, oxidation and capping. An acetonitrile wash follows each reaction. To illustrate, the deblocking step proceeds as follows. First, the outlet 18 is moved by motor 19 to the flush column 12. Valve 70 is operated so that deblocking reagent 51 flows into the supply lines 33 and 33' in sufficient quantity to prime them. Flow occurs through two position latching valve 66 which is positioned to connect supply lines 33 and 33'. During the flushing and priming operation, vacuum is applied to the flush column 12 through valve V4 so as to remove reagent from column 12 through the line 45 to the waste reservoir 37.

After priming the supply lines, valve 70 is closed and the outlet 18 is moved successively to each position in the support array. While outlet 18 is positioned over each support, valve 70 is briefly opened for the time needed to deliver an appropriate volume of reagent to each support. The deblocking reaction proceeds for an appropriate incubation time after which the reagent is removed from the reaction columns. Removal of the deblocking reagent from the reaction columns is accomplished by opening valve V3 to apply vacuum to the exit basin. Through that action all columns which have received the deblocking reagent are evacuated. After closing valve V3, valve V2 is opened to admit argon into the exit basin 17 in order to equalize pressure above and below the frit 9. Equalization of pressure on the frit is needed so that when a reagent is applied to a column, it will saturate the support for the entire incubation period until removal of the reagent occurs through application of vacuum.

In the deblocking step, a second pass of the movable outlet 18 is made over all of the columns to be coupled to provide the deblocking reagent a second time, after which incubation and removal is once again carried out. The deblocking operation often consists of four passes. The deblocking reagent used in a typical DNA synthesis is a dichloroacetic acid as shown in Table 1 below. Table 1 also presents other examples of chemical reagents for use in synthesizing the oligonucleotide sequences shown in Table 3, infra. It should be understood that the particular chemicals shown in Table 1 are illustrative of those chemicals used in a successful operation but the apparatus and methodology of the invention are not limited to any specific coupling chemistry.

TABLE 1

| DNA Synthesis Reagents | |
|---|---|
| Common Name | Composition |
| WASH | Acetonitrile |
| DEBLOCK | 2.5% dichloroacetic acid in methylene chloride |
| ACTIVATOR | 3% tetrazole in acetonitrile |
| A,C,G,T | 2.5% cyanoethyl phosphoramidite in acetonitrile |
| OXIDIZER | 2.5% iodine in 9% water, 0.5% pyridine, 90.5% THF |
| CAP A | 10% acetic anhydride in tetrahydrofuran (THF) |
| CAP B | 10% 1-methylimidazole, 10% pyridine, 80% THF |

Incubation times and the number of reagent additions at each step in the synthetic cycle vary depending on the reagent. Values for a successful protocol are given in Table 2 below. Two of the steps require mixing of reagents. That is, the coupling step requires mixing of amidite and activator and the capping step requires mixing of the Cap A and Cap B solutions. Mixing is accomplished in line 33 by rapidly opening first one valve and then the other during priming of the reagent line and during reagent additions to the reaction columns. For example, to mix the activator and the amidite "A", two position latching valve 66 is positioned to connect lines 33" and 33, and valves 61 and 62 are alternately opened and closed in a rapid manner to place amidite and activator into the supply lines 33" and 33. The valves 61 and 62 are operated under the control of computer 38 to provide a desired mixture ratios which is shown as 1.8:1 activator to amidite in Table 2. When the capping step is performed, valve 66 is positioned to connect lines 33' and 33 and valves 68 and 69 are alternately opened and closed in a rapid manner to place Cap A and Cap B solutions into the supply lines 33' and 33. The desired mixture ratio of cad A and Cap B is 1:1 as shown in Table 2.

TABLE 2

Incubation times (sec) for each reagent addition, number of additions, and approximate total volumes used (ml/oligonucleotide/cycle) for each step in the synthetic cycle.

| Reagent | Time (sec) | Additions (no.) | Total Vol. (ml) |
|---|---|---|---|
| Deblock | 15 | 4 | 0.7 |
| Wash | 2 | 5 | 0.4 |
| Couple A (+ activator)* | 15 | 3 | 0.3 |
| Couple C (+ activator)* | 15 | 3 | 0.3 |
| Couple G (+ activator)* | 15 | 3 | 0.3 |
| Couple T (+ activator)* | 15 | 3 | 0.3 |
| Wash | 2 | 5 | 0.4 |
| Oxidize | 3 | 2 | 0.1 |
| Wash | 2 | 5 | 0.4 |
| Cap (A + B)** | 10 | 3 | 0.3 |
| Wash | 2 | 5 | 0.4 |

*Combined in line at a ratio of 1.8:1, activator to amidite.
**Combined in line at a ratio of 1:1, Cap A to Cap B.

The step of coupling in the inventive procedure makes use of an asynchronous coupling concept in that the addition of each nucleotide reagent proceeds to non-adjacent columns until each support requiring that reagent has received it. At the beginning of each coupling, the control program determines which of the 32 supports require "A," carries out the addition of A to all identified supports, then determines which require "C," carries out the C additions, and so forth, until all supports have received the required nucleotide reagent.

Asynchronous coupling leads to economy in reagent use and to speed of operation. Economy occurs by avoiding the flushing and priming steps which might otherwise repeatedly occur in a sequential column to directly adjacent column operation when one column calls for A, the next for C, the third for A again, then T, etc. By limiting the need for incubation periods and flush and prime operations, the speed of operation is improved, and as the number of columns increase the benefit becomes more pronounced. This advantage results since the time to move the outlet from column to column is small compared to incubation times.

The inventive procedure allows for the parallel synthesis of oligonucleotides of different lengths. A support bearing an oligonucleotide whose synthesis has been completed will be ignored until the other syntheses are completed. All supports are oxidized and capped and if desired, all oligonucleotides are then detritylated simultaneously during a final detritylation step.

The instrument allows for synthesis of less than 32 oligonucleotides. If the input file contains only one sequence, or only six sequences, for example, reagents are delivered to only one column or to only six columns, respectively.

When the synthesis of all oligonucleotides is complete, the reaction columns are removed from the instrument. Front plate 90 is unfastened and the carrier plate 8 is removed from the reaction chamber 10 to a work bench, carrying with it all of the reaction columns 11. The DNA products may then be cleaved from their supports and subjected to conventional deprotection as is known. If desired, the DNA products may also be further purified according to well-known methods, While the automated synthesis operation is being carried out, a second carrier plate 8 can be prepared with the proper supports inserted into each of the columns in the second carrier plate for a second synthesis operation. When the first synthesis is complete and the first carrier plate is removed from the reaction chamber, the second carrier plate is then moved to the reaction chamber so that a second automated synthesis operation can commence immediately. While the second synthesis operation is carried out, the deprotection steps on the first batch can be performed, after which the first carrier plate can be readied with the proper supports for a third batch. In that manner, economy of labor is achieved. All of these manual steps, however, can be avoided by using the machine to produce the derivatized supports directly in the appropriate column.

Details of one implementation of the reaction control center 23 are shown in FIG. 7 and described above. As is well known in the art, the control program for the process is read into the system from either the disk drive 113 or the disk drive 114 and stored in RAM 112 for the actual processing operation. The input data (text files) for the sequence of adding the base reagent chemical, that is A, C, T or G, for each sequence to be produced, such as in Table 3, must also be read into the system. This may be accomplished from the disk drive or diskette drive if the sequences have been previously prepared, or they may be entered into the system from the keyboard 115 with an interactive display on output screen 116 for the computer user. To initialize the reaction control center, both the control program and the input data for the sequences to be produced must be read into RAM 112. The input data represented in Table 2 must also be read into RAM to provide the number of additions for each reagent and the timing of the various steps of the process.

TABLE 3

| | | Input nucleotide sequence data for thirty-two oligonucleotides to be synthesized concurrently on the prototype. | |
|---|---|---|---|
| oligo ID # | column # | sequence (5'-3') | length |
| 096A | 1 | TCGCAAAAAGTTGGACAAGACT | 22 |
| 096B | 2 | TTAGCAGGGTGCCTGACACTT | 21 |
| 099A | 3 | CCAAAGAGTCTAACACAACTGAG | 23 |
| 099B | 4 | ATCCGAACCAAAATCCCATCAAG | 23 |
| 203A | 5 | TACAGTCTATGAGGTTGCAAAGA | 23 |
| 203B | 6 | ATCTTAGTTCATGACAGAATTGAA | 24 |
| 209A | 7 | GTAGAAGTTAGTGACTGTCATCC | 23 |
| 209B | 8 | CCTCAGAGCCCCATACATTTCC | 22 |
| 212A | 9 | ACTCTCCGTCCTCCCAGCTC | 20 |
| 212B | 10 | GCCCCCCAAAATCTGAGGCTC | 21 |
| 214A | 11 | CGCTTGCTCACGTACATGCAG | 21 |
| 214B | 12 | TCTCTCCAGGTTCCTGAAGACT | 22 |
| TSH3 | 13 | GATAATTTTATAATAGTTTTACTCC | 25 |
| TSH4 | 14 | AGATTCCTTAGTCTCATTCC | 20 |
| TSH5 | 15 | TCAGGATATCAATGGCAAAC | 20 |
| TSH6 | 16 | CTCTACCCCTAAGGAGACAA | 20 |
| 066A | 17 | GGCGCTATGGTGCATAGGGTC | 21 |
| 066B | 18 | GATCAATAACATGTGTTTCTAATTT | 25 |
| 067A | 19 | TGAGTAATGCAATAGATACAGTATT | 25 |
| 067B | 20 | GCTTTGGCCATATGAAGAGCTTT | 23 |
| 074A | 21 | GTGCTGATGCACTCTCCATATC | 22 |
| 074B | 22 | ATTTATCCGTCTGTGCCATTACCT | 24 |
| 075A | 23 | CAGTCCACAGGGTCGTAAAGAG | 22 |
| 075B | 24 | ACTTACTGTACAACCAATTTCCAG | 24 |
| 084A | 25 | GGGAGGGGAAATTCTTTGCATTC | 23 |
| 084B | 26 | GTGACTGGAGGTCTCAGCCT | 20 |
| 088A | 27 | GATCCTCTTCTGGGAAAAGAGAC | 23 |
| 088B | 28 | CCTGTTGAAGTGAACCTTCAGAA | 23 |
| 090A | 29 | CCACTGTCAGGTGATGAGGAATC | 23 |
| 090B | 30 | ATCCTGAGAAAGGGTCTTGTGTC | 23 |
| 095A | 31 | TCCATGGGGTCGCAAACAGTGG | 22 |
| 095B | 32 | ATCCCTCCATTTGTTGTGGAGTT | 23 |

To operate the process, in addition to the initialization of the reaction control center as outlined above, the initial set up process calls for the loading of each of the reagent chemicals into the proper reservoir in accordance with the scheme shown in FIG. 3.

An important aspect of the set up procedure is to load the columns to be coupled onto the carrier tray 8. This is conveniently done on a work bench from which the carrier tray is moved for insertion into the reaction chamber where each column is positioned properly within its associated Luer fitting 15. The reaction chamber is sealed by fastening plate 90 onto the front of the reaction chamber 10. It should be noted that the location of specific supports in specific columns to be coupled must be coordinated with the sequence data in the control center. In that manner, the addition of chemicals in the proper order will be made to the proper column in the proper sequence. For example, with reference to Table 3, columns containing the proper support corresponding to the 3' end of the Table 3 sequence are loaded into the carrier tray in the order shown. Therefore, columns containing T support are placed into positions 1, 2, 12, 18, 19, 20, 22, 26 and 32. Columns containing G support are placed into positions 3, 4, 11, 23, 24 and 31. Likewise, columns with A support and columns with T support are located on the carrier tray at positions corresponding to the 3' data of Table 3.

Manual valves associated with the gas supply tank 21 are opened so that the pressurized inert gas flows into line 35 to pressurize each of the reservoirs. The gas also flows into line 36 and to the reaction chamber 10 to flood the chamber with inert gas. A manual bleeder valve, not shown, for the reaction chamber may be opened during this operation so that all of the air in the chamber is displaced as the inert gas enters. If needed, valve $V_2$ may be opened and valve $V_3$ closed so that inert gas flows into the exit basin.

Figure 8:
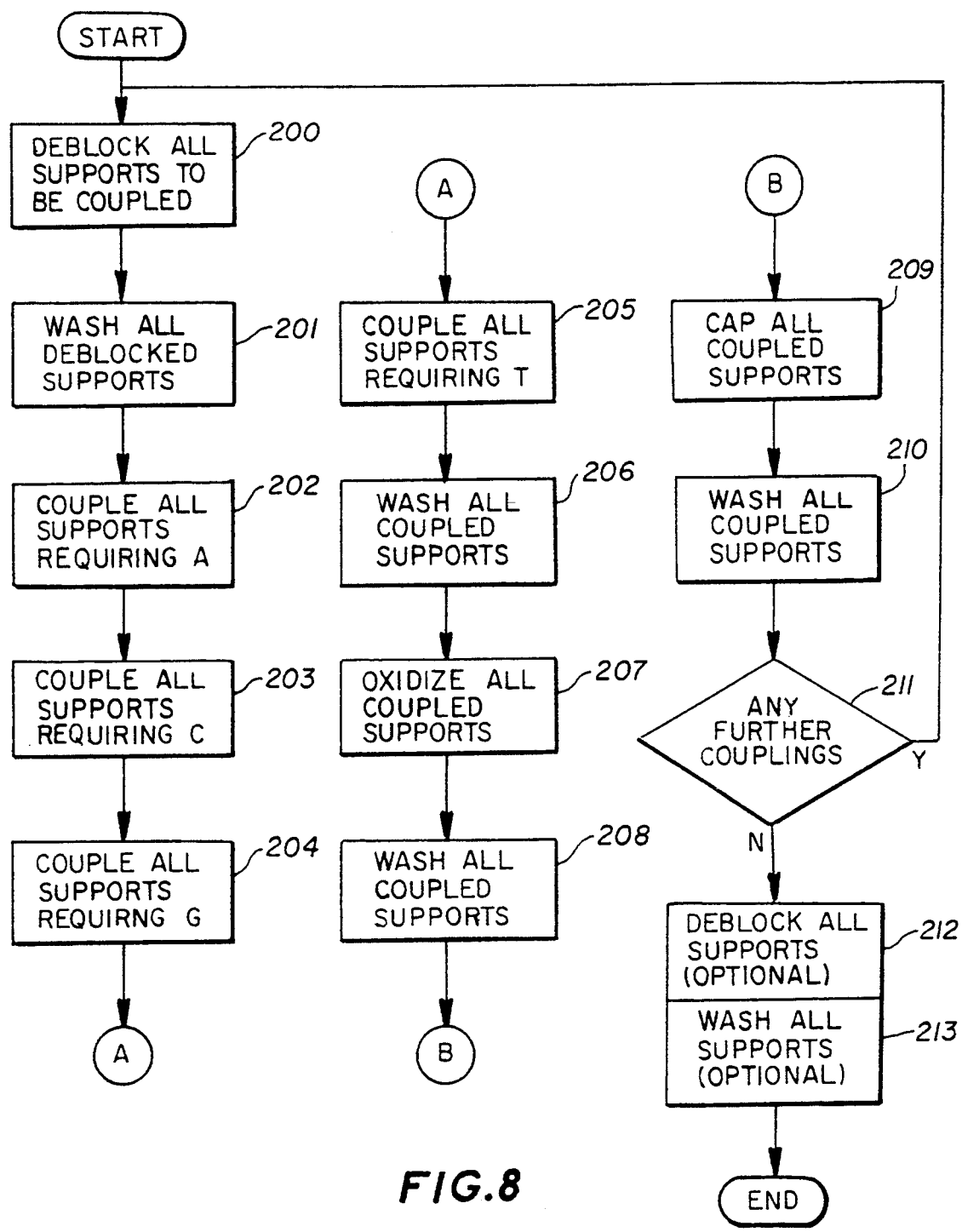
FIG. 8 is a flow diagram of the method of operating the inventive apparatus.

After the set up and initializing procedures are carried out, the apparatus is ready to begin the process of synthesizing oligonucleotides. The operation of the control program is shown in FIG. 8 where the first step 200 is to deblock all supports to be coupled. It should be observed that while 32 supports may be positioned within the prototype unit, the actual number of supports to be coupled may vary from 1 to 32 on any particular run.

The chemistry of synthesizing DNA is well known and therefore will not be explained in detail. The general object of the deblocking operation at step 200 is to remove the 5' blocking elements from the derivatized nucleosides attached to the supports. Removal of the blocking elements enables the nucleosides to be reactive to the application of coupling reagents.

Once the deblocking step has been performed, the supply line is flushed and all of the deblocked supports are washed at step 201. This step ensures that all of the deblocking chemical reagent has been removed prior to performing the next step 202 which is the coupling of all supports requiring addition of the nucleotide reagent "A" which is the common designation for reagent containing the base "adenine".

After flushing and repriming the supply line, the next step 203 in the inventive process is to couple all supports requiring the nucleotide reagent "C" which is the common designation for reagent containing the protected "cytosine" precursor. At step 204, after washing and repriming the supply line, coupling of all supports requiring the addition of nucleotide reagent "G" is carried out. G is the common designation of the nucleotide reagent containing the base "guanine." Similarly, at step 205, coupling all supports requiring the base "T" is carried out. T is the common designation for the nucleotide reagent containing the base "thymine." It should be noted that operation of the inventive apparatus is herein exampled through the use of a specific coupling chemistry making use of the above named A, C, T and G nucleotide reagents. Collectively, these reagents are often referred to as "phosphoramidite" or "amidite" reagents to distinguish them from other currently known coupling chemistries such as the "phosphotriester" and "phosphonate" chemistries. The inventive apparatus, appropriately programmed, can be used with coupling chemistries other than the one chosen herein to exemplify the operation of the machine.

After the appropriate incubation period, vacuum is applied to remove the reagents from the columns to the waste reservoir. All of the coupled supports are washed at step 206 to remove any unreacted A, C, G and T reagents. All of the coupled supports are oxidized at step 207 and washed again at step 208. A blocking compound is added to cap any nascent oligonucleotides that failed to couple at step 209. The coupled supports are washed again at step 210 and additional reagents added through the repetition of steps 200 through 210 to provide the next base in the sequence. When synthesis of the sequences shown in Table 3 has been completed, the query at step 211 results in a branch to step 212 for deblocking the supports and washing them at step 213. The supports may then be removed from the reaction chamber to the work bench for final workup involving conventional deprotection.

Figure 9A:
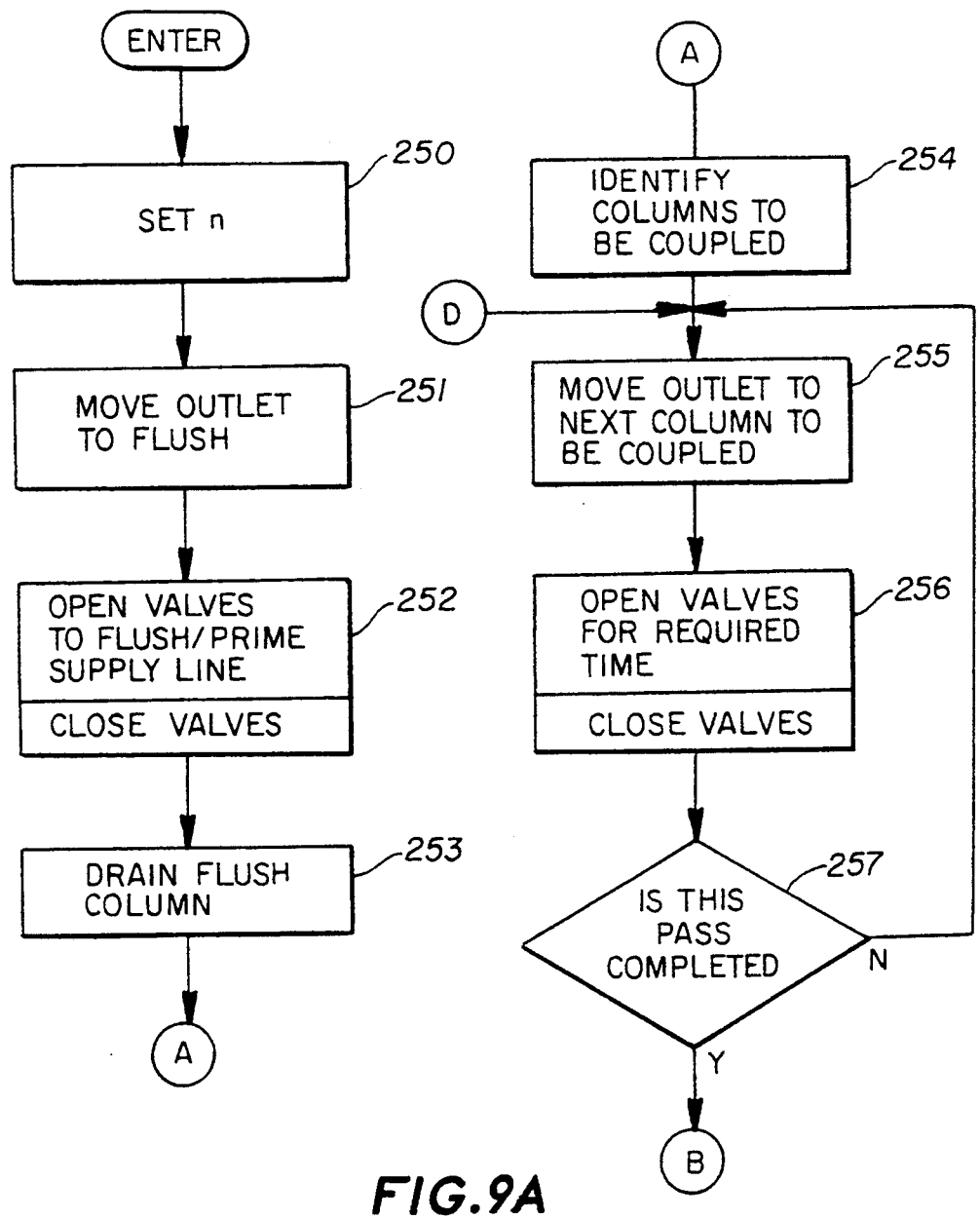
FIGS. 9A and 9B show detailed steps to implement each of the major steps of the method set forth in FIG. 8.
Figure 9B:
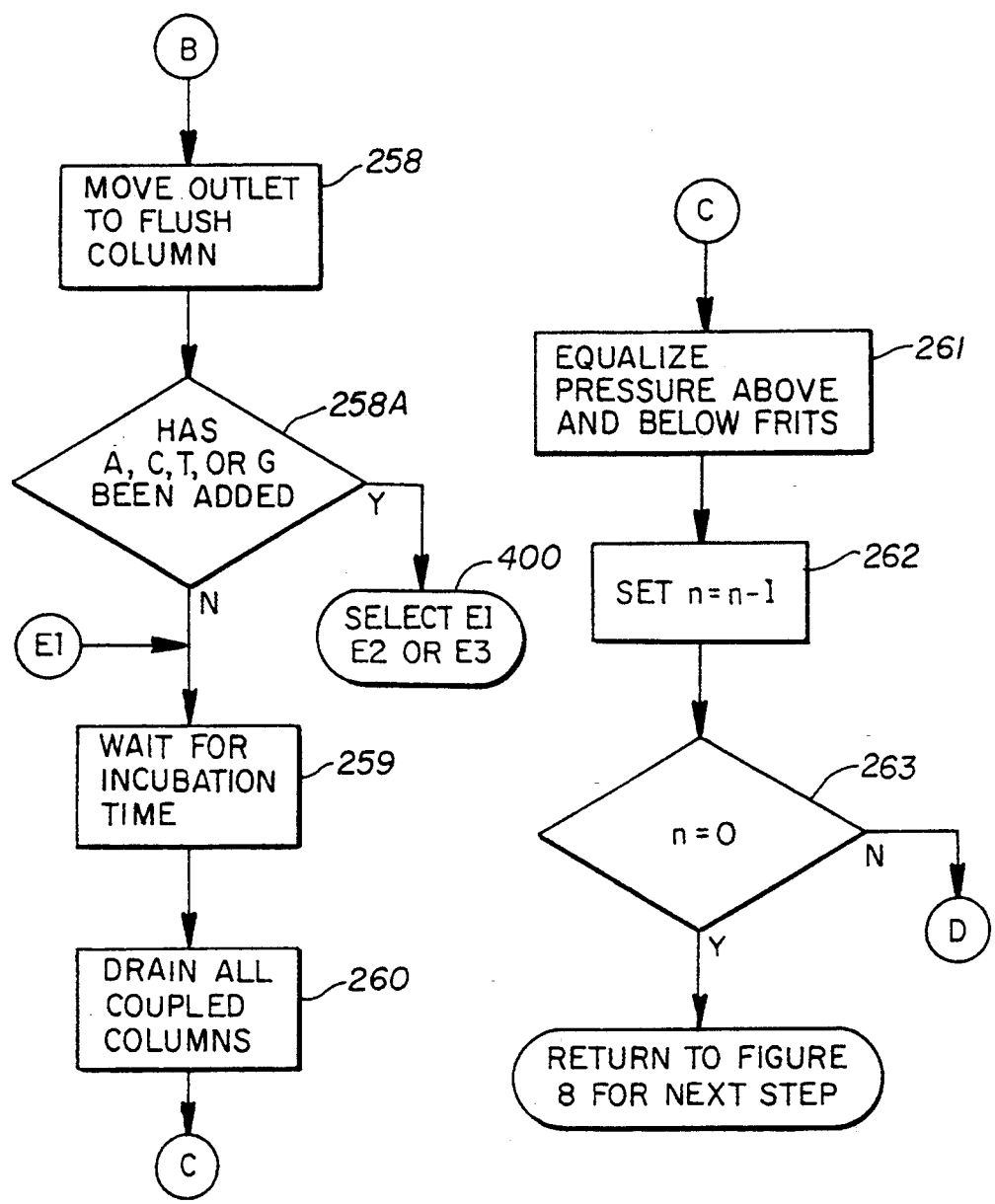

FIGS. 9A-9B are a more detailed description of the procedure performed in carrying out each of the steps of the process shown in FIG. 8. For example, when the deblocking step 200 (FIG. 8) is entered, the detailed operations of step 250-263 are performed. The first operation as shown at step 250 in FIG. 9 is to set the number of times, n, that the deblocking reagent is to be added to each column in order to provide a total of 0.7 ml of the reagent. To do that, the control program makes reference to input data shown in Table 2, to ascertain the number of additions for the deblocking step. That data shows that the deblocking step takes four additions, that is, the supply line outlet must make four passes over the columns in order to provide the needed total volume (0.7 ml) of deblocking reagent to each column, each pass delivering 0.175 ml. Therefore, the control program sets the control parameter n to equal four at step 250. At step 251 the reagent supply line outlet 18 is moved to the flush column 12. At step 252, the appropriate valves are opened in order to prime the supply line 33 with the deblocking reagent in reservoir 51. With reference to FIG. 3, valve 66 is positioned to connect lines 33 and 33' and valve 70 is actuated to connect reservoir 51 with line 33'. After flushing and priming the supply line 33 with deblocking reagent, valve 70 is closed. At step 253, which is performed concurrently with step 252, the valve $V_4$ is operated to drain the flush column.

The column numbers to be coupled are read by the control program at step 254 from input data such as Table 3 and the outlet 18 is moved by the stepper motor to the first column to be coupled at step 255. With reference to the example shown in Table 3, all 32 columns of the device are to be coupled. Oligo ID #096A will be synthesized in the first column of the linear column array and oligo ID #095B will be synthesized in the 32nd and last column of the array. As previously mentioned, the prototype device can operate to synthesize any number of oligonucleotides from one to 32, with input data such as Table 3 for any particular operation read into the computer system. In this example, since all 32 columns are in use, outlet 18 is first moved to the first column at step 255.

Valve 70 is opened at step 256 for the period of time needed to provide the proper amount of deblocking reagent (0.175 ml) to the first column. Thereafter, valve 70 is closed, and at step 257 the query is asked whether the step has been completed for all columns to be coupled (in this instanced are all columns deblocked). Since at this point in the procedure the deblocking reagent has only been added to the first column, the answer is "no," and a return is made to repeat steps 255 through 257 until all columns to be coupled have received 0.175 ml of deblocking reagent. After adding deblocking reagent to all appropriate columns (32 in this instance), reagent outlet 18 is moved to the flush column at step 258 and at step 259 the system waits until the incubation time needed for the deblocking reagent to unmask the 5' ends of the nascent oligonucleotides has been completed. Table 2 identifies that time as 15 seconds.

At step 260, valve $V_3$ is opened to apply a vacuum to the outlet end of all of the reaction columns to drain the deblocking reagent from the columns that are to be coupled. Valve $V_3$ is then closed and valve $V_2$ is opened at step 261 to introduce argon into the vacuum chamber to equalize pressure on both the inlet and outlet ends of the columns. n is set equal to n−1 at step 262, which at this point in the deblocking operation results in setting n to 3. At step 263, the query is whether n is equal to 0, and since it is not, a return is made to repeat steps 254 through 263 in order to add deblocking reagent for a second time to all of the columns to be coupled.

After a repetition of the deblocking operation step 200 four times, n is equal to 0 and the query at step 263 identifies that the deblocking operation has been completed.

When the washing step 201 (FIG. 8) is initiated to clear the supply line and the reaction columns of remaining deblocking reagent, the procedure shown in FIGS. 9A and 9B is again carried out except that n is initially set to five at step 250, as shown in Table 2, and at step 252, the valve which is opened and closed is valve 71, as may be seen by reference to FIG. 3. The flush column is drained at step 253 and at step 254, all columns to be coupled are identified. Steps 255–257 are performed until all columns to be coupled (32 in this case) contain the wash chemical. Steps 258–263 are performed to provide the proper incubation time (2 seconds), to drain the columns to equalize pressure above and below the frits and to reduce the value of n to 4. Steps 254–263 are repeated until five passes are completed and n=0.

After the wash process step 201 is completed, step 202 (FIG. 8) is entered to couple all of the supports requiring the addition of reagent A. Again, the detailed procedure for carrying out step 202 is shown in FIG. 9. n, the number of additions for the coupling step, is set equal to 3 at step 250, as shown by Table 2, and valves 61 and 62 are opened and closed at step 252 to prime the supply line. Valve 66 is also operated to connect lines 33" and 33. Note that in addition to the amidite reagent A, an activator is also introduced into the supply line together with the reagent A. This is preferably accomplished by rapidly opening and closing valves 61 and 62 during step 252 to mix the amidite and the activator in the priming of supply line 33. The flush column is drained at step 253 and the column numbers to be coupled with the amidite A are ascertained at step 254 by referring to the sequence input data in Table 3.

Table 3 shows the sequence in which couplings are carried out. As described above, the 3' nucleotide is derived from a previously produced starter support which is placed in the appropriate column as part of the set-up procedure. Thus, the first couplings to be produced in the machine add the second base from the 3' end in Table 3. Therefore, the first addition of A is to the supports in columns 3, 4, 6, 11, 15, 16, 23, 24, 27 and 28. The first addition of C is to columns 1, 7, 8, 12–14, 22 and 26. Likewise, for the first addition of G's and T's. After completion of the first additions, the second additions are accomplished and so on as the synthesis proceeds in the 3' to 5' direction for the sequences shown in Table 3.

With the input data identified, the outlet 18 is moved at step 255 to the next column to be coupled, that is, the first column to receive the addition of reagent A, column 3. At step 256, the valves 61 and 62 are again opened and closed in a rapid manner to deliver a mixture of amidite A and activator to column 3. In accordance with Table 2, the amidite/activator mixture is delivered for a time sufficient to provide 0.1 ml to column 3 on this first of three additions so that a total of 0.3 ml is delivered when all three passes are complete.

At step 257, a branch is made to step 255 for positioning the outlet be at the next column to receive amidite A, that is, column 4. Step 256 is performed to add 0.1 ml of amidite A/activator to column 4 after which the procedure of steps 255 and 256 are repeated for columns 6, 11, 15, 16, 23, 24, 27 and 28.

At this point in the procedure the first pass for adding amidite A is completed and a branch is taken at step 257 to steps 258 and 258A where the outlet is moved to its home position over the flush/prime column 12 and the query of whether an amidite A, C, T or G has been added results in a branch to step 400. At step 400, one of three procedures is selected for continuing the operation. These three separate procedures are illustrative of the many variations which can be made in the processes which utilize the inventive apparatus without parting from the spirit and scope of the invention. For example, if procedure E1 is selected, the coupling steps are performed in the same manner that has already been explained above with reference to the deblocking and washing steps. If procedure E2 is selected, the procedure is a variation of the E1 procedure except that certain steps are skipped as explained below. If procedure E3 is selected, a considerably different alternative procedure will be performed as explained below.

In procedure E1 of FIG. 9B, at step 259, the incubation period for the amidite A (15 seconds) is completed, after which the coupled columns are drained at step 260 and pressure is equalized at step 261. Since the first pass of adding the amidite A is now completed, n is set to 2 at step 262, and since n is not zero, a branch is made at step 263 to step 255 for the second pass of adding amidite A.

After completion of the second pass, the process continues for a third and final pass after which the query at step 263 results in a return to FIG. 8, step 203, for adding the amidite C.

The procedure of E1 FIG. 9B, explained above with reference to amidite A, is repeated for adding amidite C to those columns identified as requiring C. With reference to Table 3, those columns are identified by the control program as columns 1, 7, 8, 12–14, 22 and 26. After completing three passes adding amidite C to each of the columns, n=0 and the supply line is flushed and washed. Amidite G is then added in the same fashion as explained above and then amidite T. When all four nucleotide reagents have been added, a return is made for accomplishing the next step of the process shown in FIG. 8, that is, step 206 calling for the washing of all coupled supports.

The process shown in FIGS. 9A and 9B is again carried out for the washing operation of step 206 with valve 60 opened in order that the supply line 33" for the activator and amidite chemicals may be washed. After completion of step 206, the process shown in FIGS. 9A and 9B is performed again during the oxidizing step 207 by activating valve 67 with valve 66 operated to connect lines 33' and 33. Another wash step is performed at step 208 involving valve 71 and then all of the coupled supports are capped at step 209. In order to perform that step, valves 68 and 69 are alternately opened repeatedly to provide a mixing of the two capping reagents in supply line 33. The coupled supports are again washed at step 210.

At this point in the synthesis procedure, all of the steps have been completed for coupling the first nucleotide reagent to each of the starter materials for the 32 sequences shown in Table 3. That is to say, if all couplings are successful, the support in column 1 now has a C attached at the 5' end of the T already there; the support in column 2 has a T attached at the 5' end of the T already there; the support in column 3 has an A attached to the 5' end of the G; the support in column 23 has an A attached to the 5' end of the G, etc. Ideally, all the molecules produced in a particular column will be of the same length and the same nucleotide sequence. However, coupling efficiency is not perfect and some small percentage of the population of molecules may fail to couple. Any nascent oligonucleotide which failed to couple will be capped in step 209 and thus will not participate in subsequent coupling reactions. In that manner, the synthesis of shorter than full length sequences is precluded or minimized.

At step 211, the query of whether any further couplings are to be performed is answered in the affirmative since only the first coupling has been completed at this point. Table 3 shows that the particular synthesis under preparation is to provide oligonucleotide primers with base couplings ranging from 20 to 25 in length. Consequently, a branch is taken at step 211 to step 200 to repeat the entire process described above in order to add the second base coupling to each sequence. As shown in Table 3, during this part of the procedure, the support in column 1 will receive an A; the support in column 2 will receive a C; the support in column 3 will receive a G and the support in column 32 will receive a G.

The process continues after completion of the second coupling until all bases have been added to each of the 32 columns. When all couplings are completed, the procedure of FIGS. 8 and 9 will have been performed 24 times. At this point, at step 211, the query of whether further couplings are to be performed is answered in the negative and a branch is taken to step 212.

Steps 212 and 213 are optional steps that contemplate further oligo processing on a work bench as described above. Since some purification methods take advantage of the presence of the trityl group, steps 212 and 213 may not be desirable. If the steps are performed at step 212, a deblocking (detritylation) reagent is added to all columns and, after deblocking, all columns are washed at step 213. The front cover 90 is removed and the 32 support columns 11 are removed from the reaction chamber 10.

TABLE 4

Nucleotide sequences, lengths and yields of thirty-two oligonucleotides synthesized concurrently on the prototype.

| oligo ID # | sequence (5'-3') | length | yield (μg) |
|---|---|---|---|
| 096A | TCGCAAAAAGTTGGACAAGACT | 22 | 547 |
| 096B | TTAGCAGGGTGCCTGACACTT | 21 | 608 |
| 099A | CCAAAGAGTCTAACACAACTGAG | 23 | 568 |
| 099B | ATCCGAACCAAAATCCCATCAAG | 23 | 425 |
| 203A | TACAGTCTATGAGGTTGCAAAGA | 23 | 369 |
| 203B | ATCTTAGTTCATGACAGAATTGAA | 24 | 544 |
| 209A | GTAGAAGTTAGTGACTGTCATCC | 23 | 541 |
| 209B | CCTCAGAGCCCCATACATTTCC | 22 | 668 |
| 212A | ACTCTCCGTCCTCCCAGCTC | 20 | 784 |
| 212B | GCCCCCCAAAATCTGAGGCTC | 21 | 503 |
| 214A | CGCTTGCTCACGTACATGCAG | 21 | 336 |
| 214B | TCTCTCCAGGTTCCTGAAGACT | 22 | 771 |
| TSH3 | GATAATTTTATAATAGTTTTACTCC | 25 | 659 |
| TSH4 | AGATTCCTTAGTCTCATTCC | 20 | 601 |
| TSH5 | TCAGGATATCAATGGCAAAC | 20 | 385 |
| TSH6 | CTCTACCCCTAAGGAGACAA | 20 | 230 |
| 066A | GGCGCTATGGTGCATAGGGTC | 21 | 357 |
| 066B | GATCAATAACATGTGTTTCTAATTT | 25 | 515 |
| 067A | TGAGTAATGCAATAGATACAGTATT | 25 | 397 |
| 067B | GCTTTGGCCATATGAAGAGCTTT | 23 | 255 |
| 074A | GTGCTGATGCACTCTCCATATC | 22 | 558 |
| 074B | ATTTATCCGTCTGTGCCATTACCT | 24 | 572 |
| 075A | CAGTCCACAGGGTCGTAAAGAG | 22 | 471 |
| 075B | ACTTACTGTACAACCAATTTCCAG | 24 | 648 |
| 084A | GGGAGGGGAAATTCTTTGCATTC | 23 | 456 |
| 084B | GTGACTGGAGGTCTCAGCCT | 20 | 556 |
| 088A | GATCCTCTTCTGGGAAAAGAGAC | 23 | 431 |
| 088B | CCTGTTGAAGTGAACCTTCAGAA | 23 | 467 |
| 090A | CCACTGTCAGGTGATGAGGAATC | 23 | 402 |
| 090B | ATCCTGAGAAAGGGTCTTGTGTC | 23 | 471 |
| 095A | TCCATGGGGTCGCAAACAGTGG | 22 | 467 |
| 095B | ATCCCTCCATTTGTTGTGGAGTT | 23 | 597 |

The results of an early run with the 32-place prototype are shown in Table 4, which shows the yields for each of the 32 oligonucleotides produced. Total yields were based on optical density measurements of purified oligonucleotide recovered from preparative gels, and show an average total yield of approximately 500 micrograms for each sequence. The run was completed in 6 hours, with consumption of reagents during the run only about one-quarter of that to produce a similar sequence in a prior art commercial single column synthesizer even though no serious attempt was made to optimize reagent usage in the prototype. In addition to economy in reagent consumption, the time required to synthesize 32 oligonucleotides using the prototype synthesizer, is markedly less than that required by prior art single column or four column synthesizers. The innovative principals of operation embodied in the prototype, that is the "open" flow path with the inlet of each column to be coupled opened to the atmosphere of the reaction chamber, the motion controlled reagent outlet, which can move from support to support, the exit basin coupled to each of the multiple columns, and the controlled atmosphere of the chamber make it possible to further increase the concurrent production of oligonucleotide primers by simply increasing the number of columns in the device, either by adding columns to the linear array or by providing a two dimensional array of columns. Changes in hardware and software to accommodate additional columns beyond 32 are minimal, which is in sharp contrast to prior art systems. Such systems are tightly plumbed from the reagent supply system to all of the individual columns making the addition of columns a difficult matter.

One of the advantages of the inventive process described herein is that a single priming of the delivery line is all that is necessary for each amidite added during a cycle. As priming consumes significant quantities of reagent, the saving in reagent consumption is significant compared to prior art devices which have delivery lines to each column. As larger and larger numbers of oligonucleotides are prepared concurrently, the advantages of the inventive process become even more important. The effective change over of reagents during the various steps improves reagent economy, but the removal of reagents through the application of vacuum is also a significant improvement leading to economy in the amount of reagent needed. As the vacuum draws off the reagent, the column is dried thus providing more efficient use of the next reagent.

Use of the open flow path currently requires a sealed reaction chamber so that the atmosphere within the chamber can be controlled. While it might be possible to synthesize DNA without maintaining a controlled atmosphere, yields would suffer because the chemistry is very sensitive to moisture. Should a chemistry be developed that is not sensitive to moisture, it would be possible to operate the instrument in ambient conditions.

It should be noted that a balance is achieved between the forces which retain the reagent solutions in the columns, that is, forces such as surface tension and capillarity, and those forces which cause the reagents to flow out of the columns, that is, forces such as gravity and pressure differentials. By providing the balance, the reagent chemicals are allowed to saturate the column during the incubation period, but are drawn off quickly and uniformly from all columns when a pressure differential is applied.

As mentioned above, the inventive apparatus may be operated in several fashions to produce the synthesis; flexibility is a feature of the automated apparatus. To illustrate, at step 400, one of three procedures could be selected. The procedure according to the branch E1 was selected and explained above. However, should the user of the apparatus have selected the procedure E2, a branch would be made to FIG. 9C. The first entry into procedure E2 is when the first pass for adding amidite A is completed and the movable outlet has been moved to its home position over the flush/prime column 12. At step 258A, the query of whether an amidite A, C, T or G has been added, has resulted in a branch to step 400 where the procedure E2 was selected. Since n was set equal to 3 at step 250 to provide for three additions of amidite A, and since one pass is now complete, n is set to two at step 258B. Since n is not zero, a branch is made at step 258C to step 258D to wait for completion of the 15 second incubation period after which return is made to step 255 for the second pass of adding amidite A.

Note that in this variation of the procedure, a return is made to step 255 without first draining all the coupled columns and equalizing pressure above and below the frits. These steps can be skipped if the porosity of the frits are such that the reagent has substantially drained away from the support during the 15 second incubation period.

The process continues as previously described for the second pass of adding the amidite A and continues for a third and final pass after which the query at step 258C results in a branch to step 258F to wait for the incubation period. When the period is complete, all the coupled columns are drained at step 258G and pressure above and below the frits is equalized at step 258H. At this point in the procedure only amidite A has been added and therefore a return is made to the next major step of the process as shown in FIG. 8, step 203, for adding the amidite C.

Figure 9C:
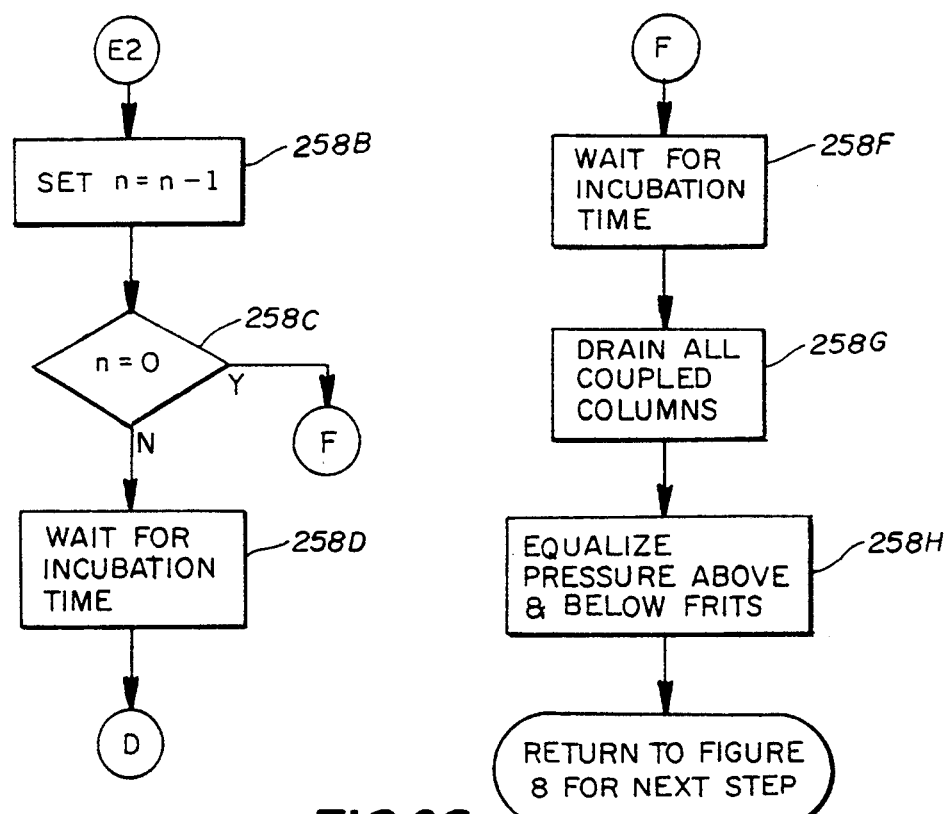
FIG. 9C shows a variation on the method of FIG. 9B.

The procedure of FIG. 9 with the E2 variation shown in FIG. 9C selected, is repeated for adding the amidite C to those columns identified as requiring C as previously described with reference to Table 3. Those columns are identified by the control program as columns 1, 7, 8, 12-14, 22 and 26. After completing three passes of adding amidite C to each of the columns, n=0, and the supply line is flushed and washed. Amidite G is then added in the same fashion as explained above and then amidite T. When all four nucleotide reagents have been added, a return is made for accomplishing the next step in the process shown in FIG. 8, that is step 206, calling for the washing of all supports.

Figure 10A:
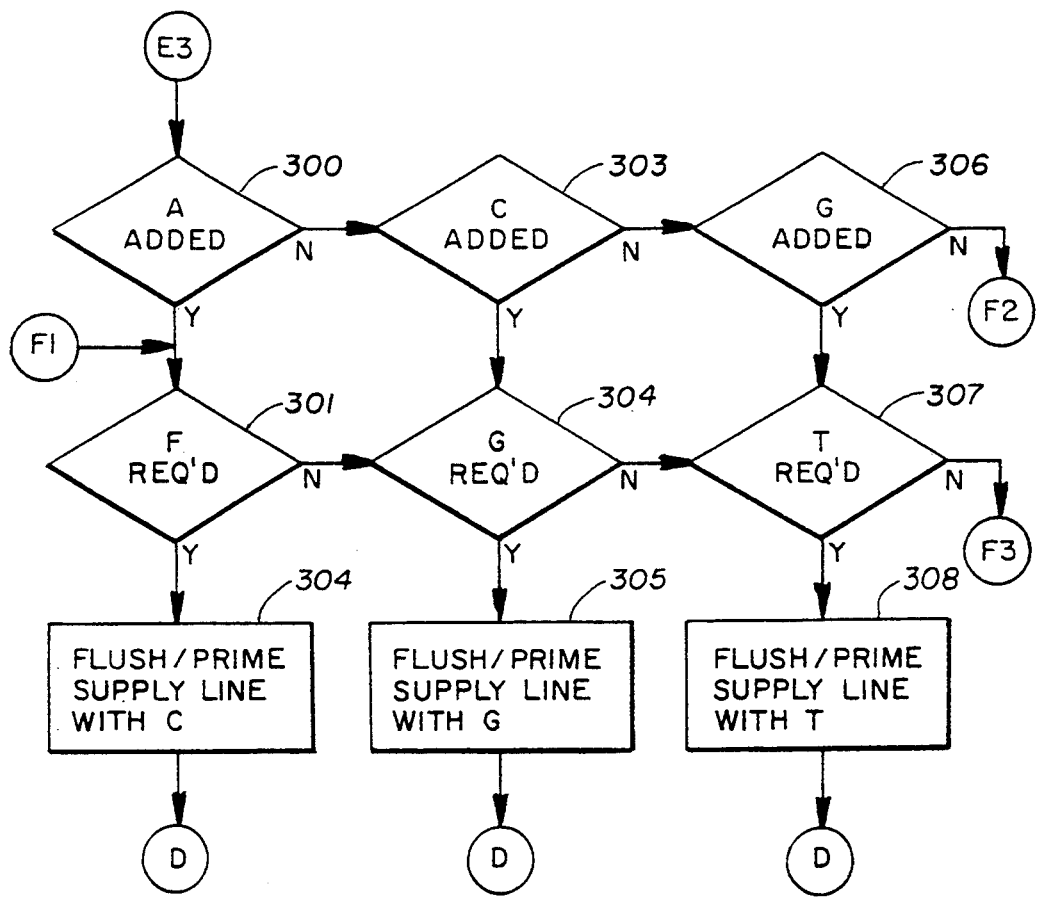
FIGS. 10A and 10B show an alternate approach to the methods of FIGS. 9B and 9C.
Figure 10B:
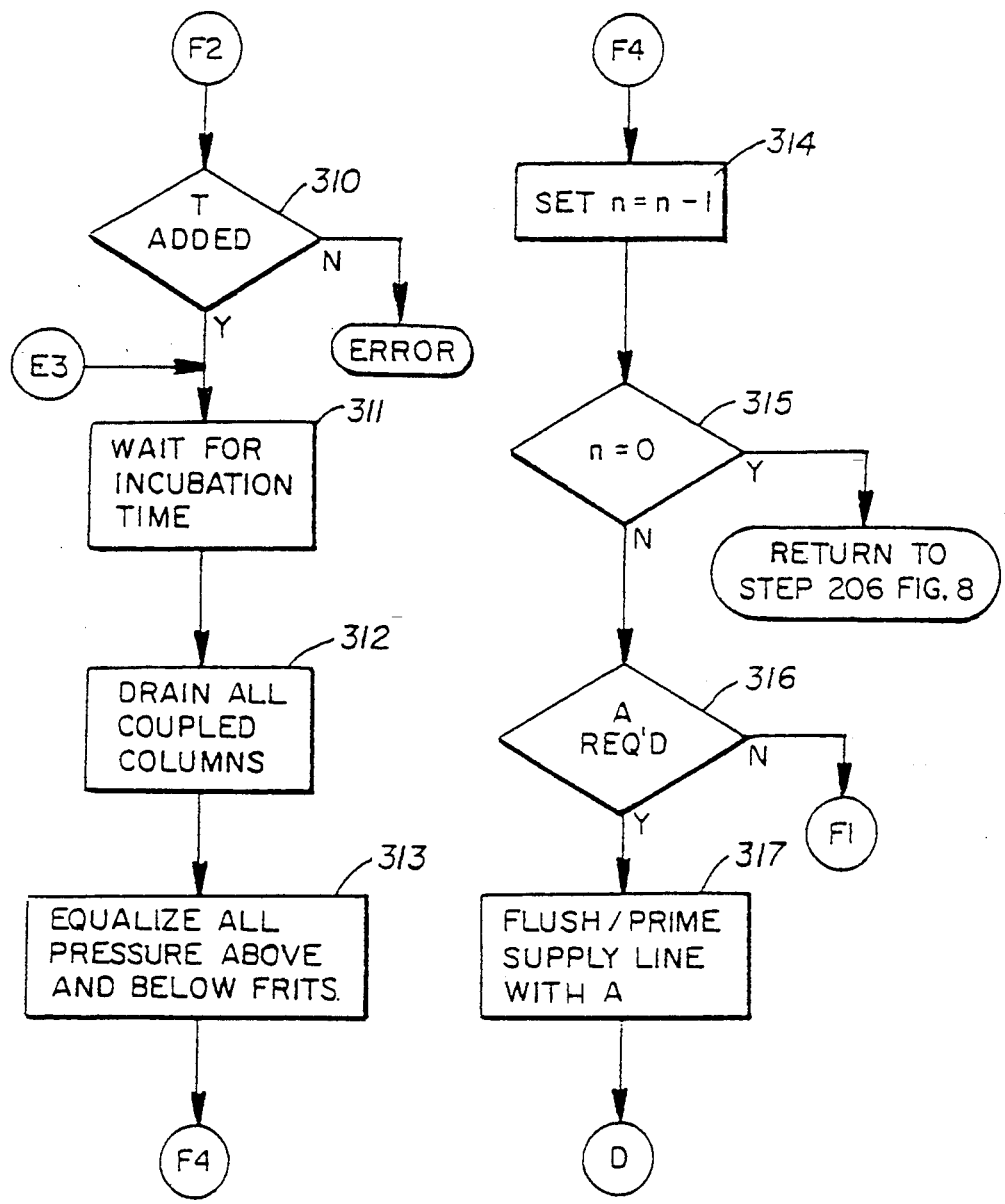

The inventive apparatus may also be operated to produce faster turnaround at the expense of using some additional reagent chemicals by altering the control program as shown in FIG. 10 through the selection of E3 at step 400. In this version, at the conclusion of the first of the three passes for a coupling step adding the first reagent, for example, A, to the designated columns, the supply line is flushed and primed with the next reagent, for example, C. The operation proceeds to add reagent C without waiting for the conclusion of the relatively long incubation period of 15 seconds. After adding reagent C, the next reagents T and G are added as required after which the process waits for a single incubation period of 15 seconds. All coupled columns are then drained simultaneously. The process then repeats two more times to achieve the three passes indicated for a completed coupling step. While this alternative uses more reagent than the E1 and E2 processes shown in FIGS. 9B and 9C, it will still use considerably less reagent than prior art systems which primed individual lines for each column. As the number of columns increase, the advantage of the inventive system becomes greater and greater. The alternative process of FIG. 10 is superior to the processes shown in FIGS. 9B and 9C in a time sense since the number of relatively long 15 second incubation time periods during which the machine is in a wait state is greatly reduced.

To perform the method of FIG. 10, the initial set up procedure is the same as described above and the first two steps shown in FIG. 8, steps 200 and 201, to deblock and wash all supports to be coupled proceed as previously described, At step 202 in FIG. 8, the control program first determines whether the reagent A is to be added. In the example synthesis of Table 3, A is required and therefore step 202 to add reagent A is performed. As previously described, the steps 250-258A, shown in FIGS. 9A and 9B, are performed to complete a first pass of adding A to all supports requiring that reagent. The query at step 258A results in a branch to step 400 and to E3 in FIG. 10 in the alternative procedure.

In FIG. 10, step 300, a determination is made that the reagent A has been added. This determination is made within the control program which calls for the addition of A at step 202, if required, and the input data of Table 3, which has required the addition of A. Alternatively, this determination could be performed by feedback from the process apparatus. At step 301, the input data of Table 3 is inspected to determine whether the addition of reagent C is required. Since it is, the supply line is flushed of A and primed with C at step 302 following which steps 255–257 are repeated until an addition of nucleotide reagent C has been made to all columns requiring that reagent. The query at step 257 then results in a branch to step 258 for moving the supply line to the flush/prime column, and a branch is again taken to E3 in FIG. 10.

Step 300 results in a branch to step 303 since A was not added on this loop through the procedure. At step 303, the control program notes that the reagent C has been added. Next, the input data of Table 3 is reviewed at step 304 to determine whether the reagent G should be added. Since the input data includes G, the supply line is flushed of C and primed with G at step 305. Steps 255–257 are again repeated until the addition of G has been made to all columns requiring that reagent. Steps 258 and 258A are then performed resulting in another entry E3 to step 300 in FIG. 10.

Since neither A nor C was added on this loop through the procedure, steps 300 and 303 are negative determinations but since G has been added, step 306 results in a branch to step 307 to determine whether reagent T is required. The input data of Table 3 is reviewed and since the reagent T is to be added, the supply line is flushed of G and primed with T at step 308. Steps 255–257 are again performed to add T to all supports requiring that reagent. Steps 258 and 258A again lead to entry at E3 into FIG. 10.

Steps 300, 303, and 306 all result in negative determinations but at step 310 a branch is taken to step 311 to wait for completion of the required incubation period of 15 seconds. After completion of the incubation period, all columns are drained at step 312 and pressure differentials above and below the frits are equalized at step 313.

The control parameter, n, is changed to 2 at step 314 signifying, in this instance, that a completed first pass has been made for all reagents to be added. Since n is not zero, a branch is made at step 315 to step 316 to inquire whether the reagent A is to be added. Since the input data of Table 3 require A, the supply line is flushed of T and primed with A at step 317. A return is made to perform steps 255–257 until all supports requiring reagent A have received an addition. Steps 258 and 258A again lead to entry E3 into FIG. 10.

The process continues as described above until all required coupling reagents have been added, that is, all couplings for the synthesis process corresponding to the input data in Table 3 have been completed. At this point, step 315 results in a branch to step 206, FIG. 8, to wash all of the coupled supports. The process is completed through all remaining steps as previously described.

As mentioned above, the inventive apparatus and procedure is of value in many situations requiring fast, economical production of large numbers of DNA (or RNA) oligonucleotides. For example, one such situation is in molecular genetic research where synthetic DNA's are used as primers in DNA sequencing by the dideoxy method. One strategy for obtaining long sequences by the dideoxy method is that of "primer-walking." In this strategy, a long template is prepared and sequencing is initiated from one end. The sequence is read as far as possible and a new primer is chemically synthesized based on sequence near the end of the first "read." The new primer is used to initiate a second round of sequencing thereby extending the initial sequence. Repetition of the process generates a long contiguous sequence which is limited, in principal, only by the length of the template. However, each step in the walking process requires synthesis of a new template-specific primer.

Parallel dideoxy sequencing of multiple long templates by a primer-walking strategy has the potential of dramatically accelerating the acquisition of sequence data by reducing the labor and expense associated with preparation of large numbers of short templates and also by reducing the effort involved in reassembling long contiguous sequences. Cost effective implementation of the parallel primer-walking approach for large scale sequencing projects is made practical by this invention.

The specific prototype of FIGS. 2–7 described has one row of columns and one supply line outlet. A two dimensional array of columns is shown in FIG. 1B and an outlet capable of two dimensional motion is provided for use with that array. Also, if desired, the apparatus could have more than one movable outlet and more than one flush/prime column. In that manner, during the 15 second incubation period for amidite A, the second outlet could supply amidite C, for example; or, the second outlet could serve an entirely different group of columns. The prototype does not include sensing devices to provide feedback data for closed loop operation. That type of operation has not been needed to date, but obviously such control could be added to the instrument, for example, if the device is built to have 100 or more columns, feedback control might become desirable.

In the above-described procedure as it relates to the prototype machine of FIGS. 2–7, setting up the machine requires the use of columns containing the proper support corresponding to the 3' end of the Table 3 sequence loaded into the carrier plate in a manner that is coordinated with the sequence data in the control center. Therefore, columns containing the T support are placed into positions 1, 2, 12, 18, 19, 20, 22, 26 and 32. Columns containing G supports are placed into positions 3, 4, 11, 23, 24, and 31. Likewise, columns with A support and columns with T support are located on the carrier tray at positions corresponding to the 3' data of Table 3. The manual set up procedure for the prototype requires the operator to systematically work through the array, placing appropriately pre-derivatized supports into their correct positions. Such an operation has not been a problem on prior art instruments with one to four columns. The possibility of misplacing a support increases for a prototype with 32 columns, and as the number of columns increase the job becomes more and more tedious and error-prone. The inventive apparatus exampled here by the 32 column prototype can be further developed and expanded to accommodate concurrent synthesis of 100 or more oligos as mentioned above with respect to the two dimensional array of FIG. 1B. To alleviate the requirement for manually placing the supports in the proper column, the inventive apparatus can also be used to produce the initial derivatized support material, and it can be done using the same array that will be used in the subsequent synthesis process.

Various support materials and various chemistries are known for producing derivatized supports. Polymeric supports, silica gel supports, cellulose and others are known as well as controlled pore glass (CPG). It is visualized that the inventive apparatus can be used for directly derivatizing these various supports. With respect to FIGS. 1B and 1C, the support material may be a porous frit-like material suitable for direct derivatization. The appropriate derivatization chemicals are placed in the reservoirs of FIG. 3 so that supply line 33 can contain the appropriate reagent in the sequence of the derivatization operation. A control program to operate the valves and to move outlet 18 must be provided together with input information providing the amount of reagent to be added, the number of additions and the incubation periods. Once the supports have been derivatized and washed, the synthesizing process described above can then be performed without incurring the danger of a manually misplaced support.

The instrument can be used, if desired, for the production of derivatized supports in a carrier plate 8 as shown in FIG. 1B without thereafter directly proceeding to the synthesizing process. In that manner, a number of derivatized supports can be accumulated for subsequent synthesizing operations.

While the invention has been described above with respect to specific embodiments, such as, for example, the particular control program format, it will be understood by those skilled in the art that various changes in form and detail may be made therein without departing from the spirit and scope of the invention. The invention has been described with a vacuum source to apply a pressure differential between the inlet and outlet ends of the reactive columns, but it is within the broad spirit and scope of the invention to provide a pressure differential by any appropriate measure. Also, while the production of primer length oligonucleotides is currently visualized as a major use of the apparatus, much longer oligonucleotides can be produced if desired. The invention receives definition in the following claims.

We claim:

1. Apparatus for automating processes including the synthesis of oligonucleotides comprising:
   a supply system including reservoirs of individual reagent chemicals, valves and an output supply line, said valves connected to said reservoirs and to said output supply line such that said output supply line can be filled with any one or more of said reagent chemicals;
   a reaction chamber containing an outlet of said output supply line;
   a reaction column located within said reaction chamber with an inlet end of said reaction column open to the atmosphere within said reaction chamber;
   a flush/prime column located within said reaction chamber, an inlet end of said flush/prime column open to the atmosphere of said reaction chamber; and
   motive means for moving said outlet of said output supply line from a first position adjacent said inlet end of said flush/prime column to a position adjacent said inlet end of said reaction column.

2. The apparatus of claim 1 further including pressure means connected to said reaction chamber for providing an equalized pressure between the inlet and outlet ends of said reaction column to enable an incubation time period in said reaction column for reagent chemical additions, and for providing a pressure differential between said inlet and outlet ends of said reaction column to drain said reaction column upon completion of said incubation time period.

3. The apparatus of claim 2 wherein said pressure means includes a vacuum source connected to an outlet end of said flush/prime column, and connected to the outlet end of said reaction column.

4. The apparatus of claim 2 further including a source of inert gas connected to said reaction chamber to fill said reaction chamber with said inert gas, said reaction chamber sealed to the surrounding atmosphere.

5. The apparatus of claim 1 further including a source of inert gas connected to said reaction chamber to fill said reaction chamber with said inert gas, said reaction chamber sealed to the surrounding atmosphere.

6. The apparatus of claim 1 wherein said reaction column includes a plurality of reaction columns, each reaction column having an inlet end open to the atmosphere of said reaction chamber, said motive means for moving said outlet of said output supply line to a position adjacent the inlet end of each of said plurality of reaction columns.

7. The apparatus of claim 6 further including control means connected to said motive means for positioning said outlet of said output supply line over a selected inlet end of one of said plurality of reaction columns.

8. The apparatus of claim 7 further including
   exit means located adjacent to and sealed from said reaction chamber for connection with the outlet end of each of said plurality of reaction columns; and
   pressure means connected to said reaction chamber and to said exit means for providing an equalized pressure between the inlet and outlet ends of said plurality of reaction columns to enable an incubation time period in said plurality of reaction columns for reagent chemical additions, and for providing a pressure differential between said inlet and outlet ends of said plurality of reaction columns to drain said plurality of columns upon completion of said incubation time period.

9. The apparatus of claim 8 further including a moveable carrier plate means for insertion into and removal from said reaction chamber, said moveable carrier plate means for holding said plurality of reaction columns, and upon assembly with said apparatus for sealing said reaction chamber from said exit means in a manner that permits atmospheric communication between said reaction chamber and said exit means only through said plurality of reaction columns.

10. The apparatus of claim 9 wherein said moveable carrier plate means is assembled into said apparatus for derivatizing reaction support material within said plurality of reaction columns and, after derivatization, for continuing with an oligonucleotide synthesis process without removing said moveable carrier plate from assembly with said apparatus.

11. The apparatus of claim 9 wherein each of said reaction columns is comprised of a porous means for sustaining said reagent chemicals when applied to said plurality of reaction columns and for allowing said reagent chemicals to pass through to said exit means upon application of said pressure differential.

12. A method of synthesizing oligonucleotides comprising the steps of:
   providing the apparatus of claim 9 wherein said moveable carrier plate means includes a first and second moveable carrier plate means;

providing said first moveable carrier plate means said with plurality of reaction columns containing derivatized supports;

locating said first moveable carrier plate means within said reaction chamber;

in a first operational run, synthesizing oligonucleotides in those plurality of reaction columns to be coupled, said first operational run under the control of a computerized reaction control center, during said first operational run, preparing said second carrier plate moveable means in accordance with said step of providing said first carrier plate moveable means with a plurality of reaction columns containing derivatized supports;

removing the first moveable carrier plate means from said apparatus at the conclusion of said first operational run; and locating said second moveable carrier plate means within said reaction chamber in order to begin a second operational run after the completion of said first operational run.

13. The apparatus of claim 8 wherein said pressure means includes a vacuum source and said exit means includes an exit basin, said exit basin connected between said vacuum source and the outlet ends of said plurality of reaction columns whereby vacuum pressure is applied to all reaction columns simultaneously.

14. The apparatus of claim 13 further including a source of inert gas connected to said reaction chamber to fill said reaction chamber with said inert gas, said reaction chamber sealed to the surrounding atmosphere.

15. The apparatus of claim 14 further including a gas line for connecting said source of inert gas to said exit basin, whereby said exit basin is filled with said inert gas, a first valve for controlling the flow of inert gas to said exit basin and a second valve for connecting said exit basin to said vacuum source, whereby said exit basin is filled with inert gas prior to the application of reagent chemicals to said plurality of reaction columns through opening said first valve with said second valve closed, and whereby said exit basin is connected to said vacuum source to remove reagent chemicals from said plurality of reaction columns by opening said second valve with said first valve closed.

16. The apparatus of claim 15 wherein each of said reaction columns is comprised of a porous means for sustaining said reagent chemicals when applied to said plurality of reaction columns and for allowing said reagent chemicals to pass through to said exit means upon application of said pressure differential.

17. The apparatus of claim 16 further including a processor means and a control program, said processor means connected to random access memory and to one or more disk and diskette drives for holding and operating said control program and for holding input data, said processor means connected to said control means for controlling said motive means, said processor means also connected to said valves, whereby said processor means operates said control program to control all aspects of the process of reagent addition to said plurality of reaction columns and the evacuation of said plurality of reaction columns after completion of said incubation time period.

18. The apparatus of claim 17 further including a display and manual input means whereby a user can adjust or replace said control program and said input data as needed.

19. A method of synthesizing oligonucleotides comprising the steps of:

providing the apparatus of claim 8, wherein each said reaction column includes a reaction support for producing oligonucleotides of the same or different lengths in a concurrent manner, said reagent chemicals including a deblocking chemical, a wash chemical, an oxidizing chemical, a capping chemical and coupling chemicals;

deblocking all reaction supports to be coupled by positioning the outlet of said output supply line with the inlet end of each of said reaction columns and dispensing deblocking chemical to the reaction support therein;

applying a first pressure differential between the inlet and the outlet end of each reaction column with said pressure means to draw deblocking chemical from each reaction support;

removing said first pressure differential and equalizing pressure on the inlet and outlet ends of said plurality of reaction columns;

washing all deblocked reaction supports by positioning the outlet of said supply line with the inlet end of each of said reaction columns and dispensing an appropriate wash chemical to the reaction support therein;

applying a second pressure differential between the inlet end and the outlet end of each reaction column with said pressure means to draw said wash chemical from each reaction support;

removing said second pressure differential and equalizing pressure on the inlet and outlet ends of said plurality of reaction columns;

coupling all reaction supports to be coupled by positioning the outlet of said output supply line with the inlet end of each of said reaction columns and dispensing an appropriate reagent coupling chemical to the reaction support therein;

applying a third pressure differential between the inlet end and the outlet end of each reaction column with said pressure means to draw said reagent coupling chemical from said reaction supports;

removing said pressure differential and equalizing pressure on the inlet and outlet ends of said plurality of reaction columns;

washing all coupled reactions supports by positioning the outlet of said output supply line with the inlet end of each of said reaction columns and dispensing an appropriate wash chemical to the reaction support therein;

applying a fourth pressure differential between the inlet ends and the outlet ends of each of said reaction columns with said pressure means to draw said wash chemical from said reaction supports;

removing said fourth pressure differential and equalizing pressure on ,the inlet and outlet ends of said plurality of reaction columns;

oxidizing all coupled reaction supports by positioning the outlet of the output supply line with the inlet end of each of said reaction columns and dispensing an appropriate oxidizing chemical to the reaction support therein;

applying a fifth pressure differential between the inlet ends and the outlet ends of each of said reaction columns with said pressure means to draw said oxidizing chemical from said reaction supports;

removing said fifth pressure differential and equalizing pressure on the inlet and outlet ends of said plurality of reaction columns;

washing all oxidized reaction supports by positioning the outlet of said output supply line with the inlet end of each of said reaction columns and dispensing an appropriate wash chemical to the reaction support therein;

applying a sixth pressure differential between the inlet ends and the outlet ends of each of said reaction columns with said pressure means to draw said wash chemical from said reaction supports;

removing said sixth pressure differential and equalizing pressure on the inlet and outlet ends of said plurality of reaction columns;

capping all oxidized reaction supports by positioning the outlet of said output supply line with the inlet end of each of said reaction columns and dispensing an appropriate capping chemical to the reaction support therein;

applying a seventh pressure differential between the inlet end and the outlet end of each of said reaction columns with said pressure means to draw said capping chemical from said reaction supports;

removing said seventh pressure differential and equalizing pressure on the inlet and outlet ends of said plurality of reaction columns;

washing all capped reaction supports by positioning the outlet of said output supply line with the inlet end of each of said reaction column and dispensing an appropriate wash chemical to said reaction support therein;

applying a eighth pressure differential between the inlet ends and the outlet ends of each of said reaction columns with said pressure means to draw said wash chemical from each said reaction supports;

removing said eighth pressure differential and equalizing pressure on the inlet and outlet ends of said plurality of reaction columns;

wherein said step of coupling of all reaction supports comprises the steps of:

first coupling all reaction supports requiring a first reagent chemical, for example A; then coupling all reaction supports requiring a second reagent chemical, for example C; then coupling all reaction supports requiring a third reagent chemical, for example G; then coupling all reaction supports requiring a fourth reagent chemical, for example T.

20. The method of claim 19 wherein each step of coupling requires a multiple number of additions of each reagent chemical to each reaction support requiring that reagent chemical, and wherein each step of coupling further includes waiting for an incubation period after each one of said additions.

21. The method of claim 19 wherein each step of coupling requires a multiple number of additions of the reagent chemical to each reaction support, and wherein a single addition of all coupling reagent chemical is performed prior to waiting for an incubation period.

22. The method of claim 21 wherein between each step of coupling a reagent chemical, the following steps are carried out:

moving the outlet of the output supply line for reagent chemicals to the inlet of said flush/prime column; and washing said output supply line by application of an appropriate wash chemical, then priming said output supply line with the next coupling reagent.

23. The apparatus of claim 8 wherein each said reaction column includes a reaction support for producing oligonucleotides of the same or different length, said reagent chemicals including a deblocking chemical, a wash chemical, an oxidizing chemical, a capping chemical and coupling chemicals, said control means further including:

means for controlling the deblocking of all reaction supports to be coupled through the addition of deblocking chemical to each reaction support to be coupled;

means for controlling the application of a first pressure differential between the inlet and the outlet end of each reaction column to draw deblocking chemical from each reaction support;

means for controlling the removal of said first pressure differential on the inlet and outlet ends of said plurality of reaction columns;

means for controlling the washing of all deblocked reaction supports through the application of an appropriate wash chemical to each reaction support;

means for controlling the application of a second pressure differential between the inlet end and the outlet end of each reaction column to draw said wash chemical from each reaction support;

means for controlling the coupling of all reaction supports to be coupled through the addition of an appropriate reagent coupling chemical to said reaction supports to be coupled;

means for controlling the application of a third pressure differential between the inlet end and the outlet end of each reaction column to draw said reagent coupling chemical from said reaction supports;

means for controlling the washing of all coupled reaction supports through the application of an appropriate wash chemical to each said reaction support;

means for controlling the oxidation of all coupled reaction supports through the addition of an appropriate oxidizing chemical to each said reaction support;

means for controlling the application of a fourth pressure differential between the inlet ends and the outlet ends of said plurality of reaction columns to draw said oxidizing chemical from each said reaction support;

means for controlling the washing of all oxidized reaction supports through the application of an appropriate wash chemical to each said reaction support;

means for controlling the capping of all coupled reaction supports through the application of an appropriate capping chemical to each of said coupled reaction supports;

means for controlling the application of a fifth pressure differential between the inlet end and the outlet end of said plurality of reaction columns to draw said capping chemical from each said reaction support;

means for controlling the washing of all capped reaction supports through the application of an appropriate wash chemical to each said reaction support;

wherein said means for controlling the coupling of all reaction supports further comprises:

first means for controlling the coupling of all reaction supports requiring a first reagent chemical, for example A;

second means for controlling the coupling of all reaction supports requiring a second reagent chemical, for example C;

third means for controlling the coupling of all reaction supports requiring a third reagent chemical, for example G; and fourth means for controlling the coupling of all reaction supports requiring a fourth reagent chemical, for example T, and means for sequentially controlling the operation of said first, second, third and fourth means for adding said first coupling reagent chemical to all reaction columns requiring that reagent chemical before adding said second, third or fourth reagent chemicals to reaction columns requiring those reagent chemicals.

24. The apparatus of claim 23 wherein said means for controlling the coupling of said reaction supports includes means for controlling the application of a multiple number of additions of each reagent chemical to each reaction support requiring that reagent chemical, and further includes means for controlling an incubation period after each one of said additions.

25. The apparatus of claim 23 wherein said means for controlling the coupling of said reaction supports includes means for controlling the application of a multiple number of additions of the reagent chemical to each reaction support, and means for controlling the application of a single addition of all coupling reagent chemicals prior to waiting for an incubation period.

26. The apparatus of claim 25 wherein said means for controlling the coupling of said reaction supports includes:

activation means energized between each coupling operation for initiating the movement of the outlet of the output supply line to the inlet of said flush/-prime column;

means for controlling the washing of said output supply line by application of an appropriate wash chemical; and means for controlling the priming of said output supply line with the next coupling reagent.

* * * * *